United States Patent
Trepagnier et al.

(10) Patent No.: US 11,036,865 B2
(45) Date of Patent: Jun. 15, 2021

(54) SYSTEMS AND METHODS FOR RISK RATING OF VULNERABILITIES

(71) Applicant: Massachusetts Institute of Technology, Cambridge, MA (US)

(72) Inventors: Pierre C. Trepagnier, Medford, MA (US); Dennis Ross, Hanscom AFB, MA (US); Allan Wollaber, Auburndale, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 192 days.

(21) Appl. No.: 16/027,715

(22) Filed: Jul. 5, 2018

(65) Prior Publication Data
US 2020/0012796 A1  Jan. 9, 2020

(51) Int. Cl.
*G06F 21/57* (2013.01)
*H04L 29/06* (2006.01)
*G06K 9/62* (2006.01)
*G06N 20/00* (2019.01)

(52) U.S. Cl.
CPC ......... *G06F 21/577* (2013.01); *G06K 9/6218* (2013.01); *G06K 9/6267* (2013.01); *G06N 20/00* (2019.01); *H04L 63/1433* (2013.01); *H04L 63/20* (2013.01); *G06F 2221/033* (2013.01); *G06F 2221/034* (2013.01)

(58) Field of Classification Search
CPC ............. G06F 21/577; G06F 2221/033; G06F 2221/034; G06K 9/6218; G06K 9/6267; H04L 63/1433; H04L 63/20; G06N 20/00
USPC ......................................................... 726/25
See application file for complete search history.

(56) References Cited

U.S. PATENT DOCUMENTS

| | | | |
|---|---|---|---|
| 7,908,660 B2* | 3/2011 | Bahl | G06F 21/577 726/25 |
| 9,195,829 B1* | 11/2015 | Goradia | G06N 20/00 |
| 9,824,216 B1* | 11/2017 | Khalid | G06F 21/566 |
| 10,015,186 B1* | 7/2018 | Tamir | H04L 63/1433 |
| 10,021,125 B2* | 7/2018 | Talamanchi | H04L 63/20 |
| 10,447,709 B2* | 10/2019 | Giakouminakis | G06F 21/577 |
| 2004/0221176 A1* | 11/2004 | Cole | G06F 21/577 726/25 |
| 2005/0210533 A1* | 9/2005 | Copeland | H04L 63/1416 726/23 |
| 2006/0242709 A1* | 10/2006 | Seinfeld | G06F 21/56 726/24 |

(Continued)

OTHER PUBLICATIONS

Estimating and Controlling the False Discovery Rate of the PC Algorithm Using Edge-specific P-Values Eric V. Strobl, Peter L. Spirtes, Shyam Visweswaran ACM Transactions on Intelligent Systems and Technology, vol. 10, Issue 5. Article No. 46, pp. 1-37 (Year: 2019).*

(Continued)

*Primary Examiner* — Samson B Lemma
*Assistant Examiner* — Mohammad S Shams
(74) *Attorney, Agent, or Firm* — McCarter & English, LLP; David R. Burns

(57) ABSTRACT

Systems, methods and computer readable mediums for determining a risk rating for software vulnerabilities of host devices and services on an enterprise network are discussed. Risk-rating systems and methods prioritize cyber defense resources utilizing both network-independent and network-specific approaches.

33 Claims, 19 Drawing Sheets

(56) References Cited

U.S. PATENT DOCUMENTS

| | | | | |
|---|---|---|---|---|
| 2007/0285578 | A1* | 12/2007 | Hirayama | G06T 7/20 |
| | | | | 348/700 |
| 2013/0191919 | A1* | 7/2013 | Basavapatna | H04L 63/1408 |
| | | | | 726/25 |
| 2014/0189873 | A1* | 7/2014 | Elder | H04L 63/1433 |
| | | | | 726/25 |
| 2016/0232358 | A1* | 8/2016 | Grieco | G06F 21/577 |
| 2017/0098087 | A1* | 4/2017 | Li | H04L 63/1433 |
| 2017/0366561 | A1* | 12/2017 | Petersen | H04L 63/1416 |
| 2018/0330103 | A1* | 11/2018 | Chari | H04L 41/12 |
| 2019/0052665 | A1* | 2/2019 | Mahieu | G06N 3/04 |
| 2019/0166150 | A1* | 5/2019 | Bulut | H04L 51/02 |
| 2019/0188212 | A1* | 6/2019 | Miller | G06F 16/285 |

OTHER PUBLICATIONS

The Laws of Vulnerabilities: Which security vulnerabilities really matter? Gerhard Eschelbeck Information Security Technical Report. pp. 1-7 (Year: 2005).*

Allodi et al., Comparing Vulnerability Severity and Exploits Using Case-Control Studies. ACM Transactions on Information and System Security (TISSEC). Mar. 2013;9(4):39:1-39:20 including appendix.

Allodi et al., Economic Factors of Vulnerability Trade and Exploitation. CCS '17, Proceedings of 2017 ACM SIGSAC Conference on Computer and Communications Security. pp. 1483-1499, (2017).

Allodi et al., The Work-Averse Cyber Attacker Model: Theory and Evidence From Two Million Attack Signatures. SSRN, retrieved online at: https://papers.ssrn.com/sol3/papers.cfm?abstract_id=2862299. 35 pages, May 29, 2017.

Alperin et al., Risk Prioritization by Leveraging Latent Vulnerability Features in a Contested Environment. 87th MORS Symposium, Working Group 5, 14 pages, Feb. 28, 2019.

Edkrantz et al., Predicting Vulnerability Exploits in the Wild. 2015 IEEE 2nd International Conference on Cyber Security and Cloud Computing. pp. 513-514, Nov. 3-5, 2015.

Fireeye Labs, APT28: At the Center of the STorm: Russia Strategically Evolves its Cyber Operations. Retrieved online at: https://www2.fireeye.com/rs/848-DID-242/images/APT28-Center-of-Storm-2017.pdf. 15 pages, Jan. 2017.

Fireeye Labs, Operation RussianDoll: Adobe & Windows Zero-Day Exploits Likely Leveraged by Russia's APT28 in Highly-Targeted Attack. Retrieved online at: https://www.fireeye.com/blog/threat-research/2015/04/probable_apt28_useo.html. 7 pages, Apr. 18, 2015.

Grimes, Implementing a Data-Driven Computer Security Defense Microsoft IT Information Security and Risk Management. https://gallery.technet.microsoft.com/Fixing-the-1-problem-in-2e58ac4a. 43 pages, Mar. 2017.

Lin et al., Machine Learning in Vulnerability Databases. 2017 10th International Symposium on Computational Intelligence and Design (ISCID). pp. 108-113, Dec. 9-10, 2017.

Lippmann et al., Continuous Security Metrics for Prevalent Network Threats: Introduction and First Four Metrics. Project Report IA-3. Lincoln Laboratory, Massachusetts Institute of Technology. 108 pages, May 22, 2012.

Lippmann et al., Threat-Based Risk Assessment for Enterprise Networks. Lincoln Laboratory Journal. 2016;22 (1):33-45.

Martin, Managing Vulnerabilities in Networked Systems. Computer. 2001, pp. 32-38.

Mell et al., Common Vulnerability Scoring System. IEEE Security & Privacy. Nov.-Dec. 2006;4(6):85-89.

Nehemiah Security, RQ: Risk Quantifier, Quantify and Communicate Cyber Risks in Dollars. Retrieved online at: https://nehemiahsecurity.com/solutions/rq/. 9 pages, (2019).

Office of the Deputy Assistant Secretary of Defense for Systems Engineering. Department of Defense Risk, Issue and Opportunity Management Guide for Defense Acquisition Programs, Washington DC, Department of Defense. 96 pages, Jan. 2017.

Reuf, Exploit Pricing, Analysis of the Market in Digital Weapons. SCIP, retrieved online at: https://www/scip.ch/en/?labs.20161013, 8 pages, Oct. 13, 2016.

Ross et al., Latent feature vulnerability ranking of CVSS vectors. SummerSim '17 Proceedings of the Summer Simulation Multi-Conference. p. 119-130, Jul. 9-12, 2017.

Ross et al. Vulnerability Ranking by Exploit Association in a Latent Feature Space. Journal of Defense Modeling and Simulation.

Srivastava et al., Dropout: A Simple Way to Prevent Neural Networks from Overfitting. Journal of Machine Learning Research. 2014;15:1929-1958.

Tavabi et al., DarkEmbed: Exploit Prediction with Neural Language Models. The Thirtieth AAAI Conference on Innovative Applications of Artificial Intelligence (IAAI-18). pp. 7849-7854, Apr. 2018.

VULDB—The Crowd-Based Vulnerability Databse. Exploit Prices. Retrieved online at: https://vuldb.com/?doc.exploitprices. 3 pages, (1997-2019).

Wollaber et al., Exploit Probabilities Conditioned on CVSS Scores. MIT Lincoln Laboratory Technical Report, DCO-1 (2016).

Zhang et al., An Empirical Study on Using the National Vulnerability Database to Predict Software Vulnerabilities. Database and Expert Systems Applications. pp. 217-231, (2011).

* cited by examiner

US 11,036,865 B2

SYSTEMS AND METHODS FOR RISK RATING OF VULNERABILITIES

STATEMENT OF GOVERNMENT INTEREST

This invention was made with Government support under Grant No. FA8702-15-D-0001 awarded by the U.S. Air Force. The Government has certain rights in the invention.

BACKGROUND

Enterprise networks typically have a large number of hosts and services which each may have one or more software vulnerabilities. These software vulnerabilities are an important avenue of attack on the enterprise. Different vulnerabilities represent differing amounts of risk to the enterprise. Network defenders are tasked with attempting to fix as many vulnerabilities as possible in as short a time as possible through the application of software patches designed to address the vulnerabilities or by uninstalling software when the vulnerability cannot be repaired.

SUMMARY

In one embodiment, a system for determining a risk rating for software vulnerabilities is provided. The system includes one or more computing devices that include a processor and a memory, and one or more databases holding data related to at least one of known software vulnerabilities and known exploits. The one or more computing devices are configured to execute at least one of a vulnerability module and exploit module. The vulnerability module when executed generates a vector space holding vectors for the known software vulnerabilities based on the data related to known software vulnerabilities. Each vector is associated with a set of characteristics of a corresponding known software vulnerability. The vulnerability module also groups the known software vulnerabilities into one or more sets of similar software vulnerabilities based on the characteristics. The exploit module when executed determines the applicability of one or more known exploits to individual software vulnerabilities represented in the one or more sets of similar software vulnerabilities using the data related to known exploits. The exploit module also determines a risk rating for each of the one or more sets of similar software vulnerabilities based on the determined applicability of the known exploits to individual software vulnerabilities represented in each of the one or more sets of similar software vulnerabilities and stores and associates the risk rating with a corresponding set of similar software vulnerabilities in a database.

In another embodiment, a computer-implemented method for determining a risk rating for software vulnerabilities is provided. The method includes generating a vector space holding multiple vectors for the multiple known software vulnerabilities. Each vector includes a set of characteristics of a corresponding known software vulnerability. The method also includes grouping the known software vulnerabilities into one or more sets of similar software vulnerabilities based on the characteristics. The method further includes determining the applicability of one or more known exploits to individual software vulnerabilities represented in the one or more sets of similar software vulnerabilities using the data related to known exploits. The method additionally includes determining a risk rating for each of the one or more sets of similar software vulnerabilities based on the determined applicability of the known exploits to individual software vulnerabilities represented in each of the one or more sets of similar software vulnerabilities and storing and associating the risk rating with a corresponding set of similar software vulnerabilities in a database.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings.

DESCRIPTION OF EXEMPLARY EMBODIMENTS

Figure 1:
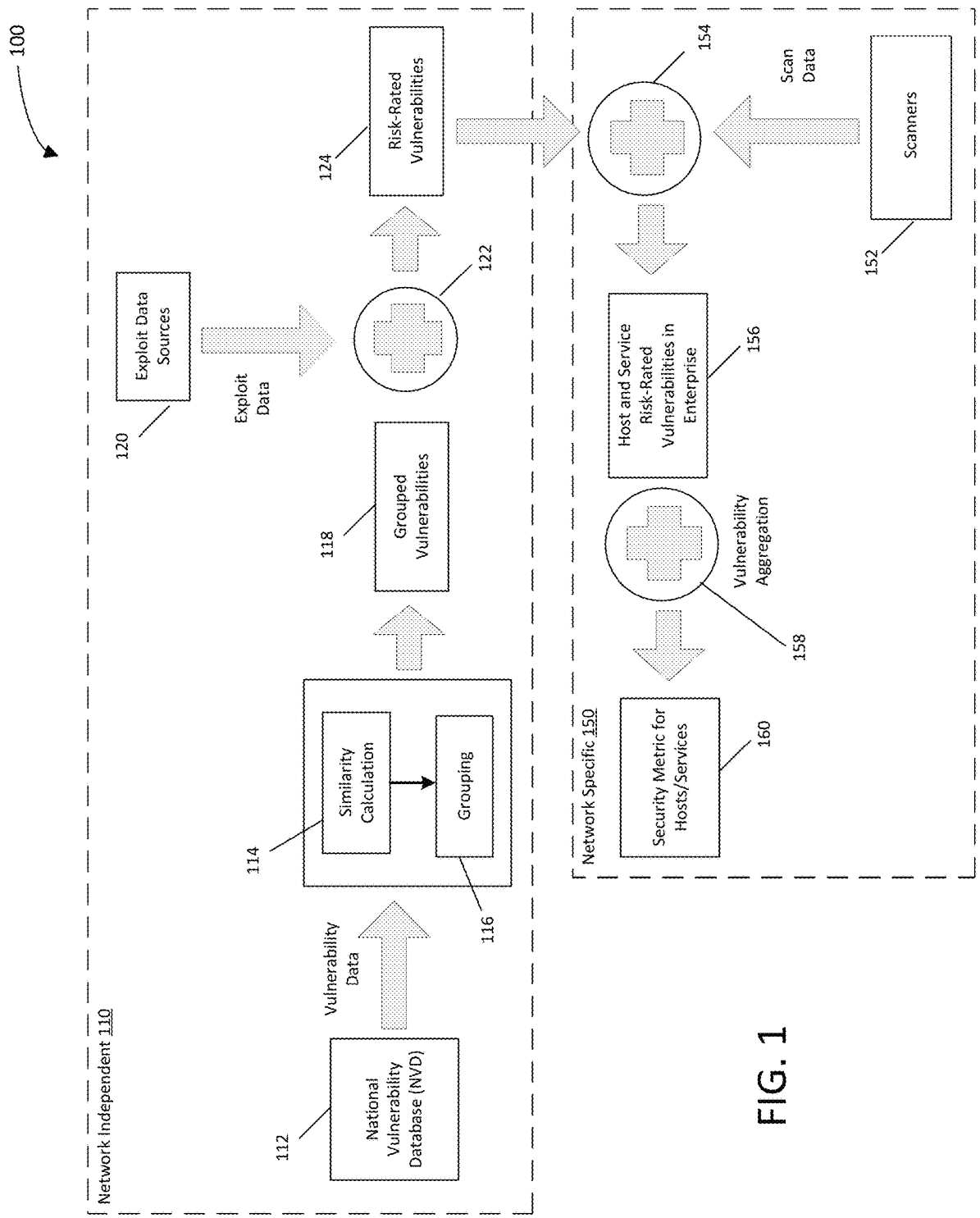
FIG. 1 depicts an exemplary architecture for a risk rating system for software vulnerabilities, according to an example embodiment.

For malicious actors, software vulnerabilities are an important avenue of attack on a computer network. To help identify these software vulnerabilities the National Institute of Standards and Technology created the National Vulnerability Database (NVD) and the Common Vulnerability Scoring System (CVSS) to provide open and universally standard severity ratings of software vulnerabilities. Software vulnerabilities are entered into the NVD, as they are discovered, and assigned a CVSS score. Conventional vulnerability detection systems use the NVD for automatically scanning hosts on a network to find software vulnerabilities. A scan of a modestly-sized enterprise network may contain tens to hundreds of thousands of vulnerabilities of varying severity, from critical to minor. In an ideal case, network defenders would mitigate all of the extant vulnerabilities through the application of software patches or by uninstalling software. However, in practice the volume of software vulnerabilities that a typical enterprise has to deal with is far too large for the enterprise to address every vulnerability. Because of this, vulnerability prioritization is essential. Additionally, because vulnerabilities are only potential avenues of exploitation, only a small fraction of potential vulnerabilities are ever observed to be actually exploited. The CVSS score alone does not discriminate these exploit-associated vulnerabilities from never-exploited vulnerabilities. As a result, even in a scenario of sufficient resources and time in which it were possible to fix all of the "critical" vulnerabilities as designated by the CVSS score, such an approach would still leave many exploit-associated vulnerabilities that have lower CVSS scores at risk of exploitation. Another complicating factor is that not all exploits are created equal. Some exploits are freely available online, some can be purchased on the dark web, and some require expensive software development to make them deployable. Further, conventional vulnerability scanners often just report the number of vulnerabilities of various severity levels. This leads to poor risk aggregation when multiple vulnerabilities are discovered on a single host or software service.

Given this landscape, there are several issues with conventional vulnerability detection systems. The first issue is that network defenders are focused on keeping vital hosts and services up and operational, not fixing vulnerabilities for their own sake. The hosts and services may contain multiple vulnerabilities, and there needs to be a way of aggregating many vulnerabilities together to arrive at an estimate of the security risk to the host and service. The second issue is that conventional vulnerability scanners do a poor job of prioritizing the vulnerabilities that are most appealing from either an attacker's point of view in general, or from the point of view of a specific potential attacker with a known modus operandi. This leads to a compliance-based vulnerability mitigation strategy providing little enhanced security aside from assuring the compliance of a particular system.

To address these concerns, embodiments of the present invention provide risk-rating systems and methods for prioritizing cyber defense resources utilizing both network-independent and network-specific approaches. Exploit-associated vulnerabilities (i.e. vulnerabilities that have actually been exploited) are prioritized over potential vulnerabilities that have not been exploited as the exploit-associated vulnerabilities pose a greater risk. More particularly, similar potential software vulnerabilities are grouped together into sets of similar software vulnerabilities and the prevalence of known exploits associated with the vulnerabilities in the sets of similar software vulnerabilities is determined as a means for assigning a risk rating to different sets of vulnerabilities. This risk rating may then be used in combination with network-specific data identifying present software vulnerabilities for hosts/services in an enterprise network to identify a risk rating for a given host/service. Additionally, lower-priced (or free) exploits are available to a broader population of attackers with limited resources than expensive exploits, and so in some embodiments the vulnerabilities associated with 'cheap' exploits are ranked higher than vulnerabilities associated with expensive-to-develop exploits. In one embodiment, the value of the host/service from a malicious actor's viewpoint is also considered as not all targets are created equal. The value of the target and the cost of the attack on the specific host may be used together to determine a security metric for each of the hosts/services in the enterprise network and this security metric can be used to prioritize the response to software vulnerabilities.

Embodiments thus provide systems and method for calculating an improved (data-driven) measure of risk on individual vulnerabilities of a host or service and incorporate an improved method for assessing the multiple vulnerabilities which may exist on the host or service to arrive at an overall security metric for the host or service in a manner which can scale to enterprise networks.

As used herein, "software vulnerability" or "vulnerability" refers to a weakness in computational logic that can be exploited, attacked or hacked. As used herein, "exploit" refers to the means for exploiting, attacking or hacking a vulnerability. An exploit may be a software program that enables an attacker or hacker to exploit a specific vulnerability. As used herein the term "host" refers to an enterprise network element including devices executing on or accessible over an enterprise network. As used herein the term "service" refers to a software element executing on or accessible over an enterprise network.

In one embodiment, a vector space is generated based on data related to known software vulnerabilities, the software vulnerabilities are grouped into one or more sets of similar vulnerabilities and the applicability of known exploits to individual software vulnerabilities represented in the sets of similar software vulnerabilities is determined. This association can then be used to group or rank vulnerabilities according to their likelihood of exploitation by an attacker or group of attackers. Given data on temporal or financial costs of exploit development, approximate costs of exploitation per device or vulnerability may be assigned, allowing for an assignment of the total cost of exploitation ("cost to pwn") for a device. Further, given approximate valuations of hosts, a "return on investment" can be constructed for each host, illuminating how an attacker would view and potentially prioritize an attack on a network of hosts.

FIG. 1 depicts an exemplary architecture and related steps performed by a risk rating system 100 that identifies software vulnerabilities, according to an example embodiment.

The portion of the system 100 enclosed in box 110 denotes components and steps that are network independent. The network independent components and steps relate to assigning a risk rating to known software vulnerabilities. The inputs of box 110 are known vulnerability data and known exploit data, both of which are network or host-independent. The inputs thus convey information on a general threat environment.

As depicted, vulnerability data relating to known software vulnerabilities is input from a third party source, for example, the National Vulnerability Database (NVD) 112. The NVD is a repository of standards based vulnerability management data represented using the Security Content Automation Protocol (SCAP). The NVD includes databases of security-related software flaws, misconfigurations, product names, and impact metrics.

The vulnerability data is analyzed for similarity calculations at block 114. As discussed further below, a vector space is created to hold vectors based on measurement dimensions used to form the CVSS base score for each software vulnerability. A distance metric counts the number of vector elements which are the same for the vectors in the vector space. Grouping techniques, such as but not limited to clustering techniques, are applied 116 to generate one or more sets of similar software vulnerabilities at block 118.

Data relating to known exploits is retrieved from third party sources 120. The third party sources 120 may include, but are not limited to, sources available on the dark web, information available from commercial security providers such as Symantec®, information available at open source exploit databases, information available from intelligence agencies, and the like.

At block 122, the sets of similar of software vulnerabilities 118 and the data relating to known exploits 120 are analyzed to determine a risk rating 124 for each of the sets of similar software vulnerabilities. In one embodiment, the known exploit data may be used to generate a vector space which may then be associated with the sets of similar software vulnerabilities to determine the applicability of exploits to vulnerabilities. The application of known exploit data to the sets of similar software vulnerabilities is described further below.

In one embodiment, the network-independent portion 110 of risk rating system 100 can be used to determine a risk rating for software vulnerabilities based on a specific threat. For example, the data from the third party sources 120 may be filtered to focus on a specific attacker and therefor, determine specific risk ratings for the software vulnerabilities from that attacker based on the attacker's techniques, tools, and procedures (TTPs).

The second portion of the system 100 that is enclosed in box 150 denotes components and steps that are network-specific to determine a security metric for particular hosts or services in a computer network such as, but not limited to, large and small enterprise networks. For ease of explanation, the description hereafter may refer to only hosts when discussing the network element being analyzed but it should be understood to also include the analysis of services in a network unless not appropriate based on the context of the discussion. At block 152, the host/service is scanned using third party scanners to identify software vulnerabilities of the host/service. The third party scanners 152 may include, but are not limited to, Nessus® by Tenable™, SteelCentral™ by Riverbed®, and the like. It will be appreciated that a system 100 may also employ its own scanning/detecting process rather than a third-party scanner without departing from the scope of the present invention.

At block 154, the scan data showing network-specific vulnerabilities and the previously determined risk-rated vulnerabilities 124 are analyzed to determine a risk rating for each of the host-specific and service-specific vulnerabilities 156. At block 158, the multiple host-specific/service-specific vulnerabilities 156 are aggregated 158 to determine a security metric 160 for the host/service. As explained further below, instead of aggregation, the security metric may instead be generated by performing an attacker valuation analysis that includes consideration of the cost of an exploit for an attacker to attack an identified vulnerability and the value of the host to the attacker.

Figure 2:
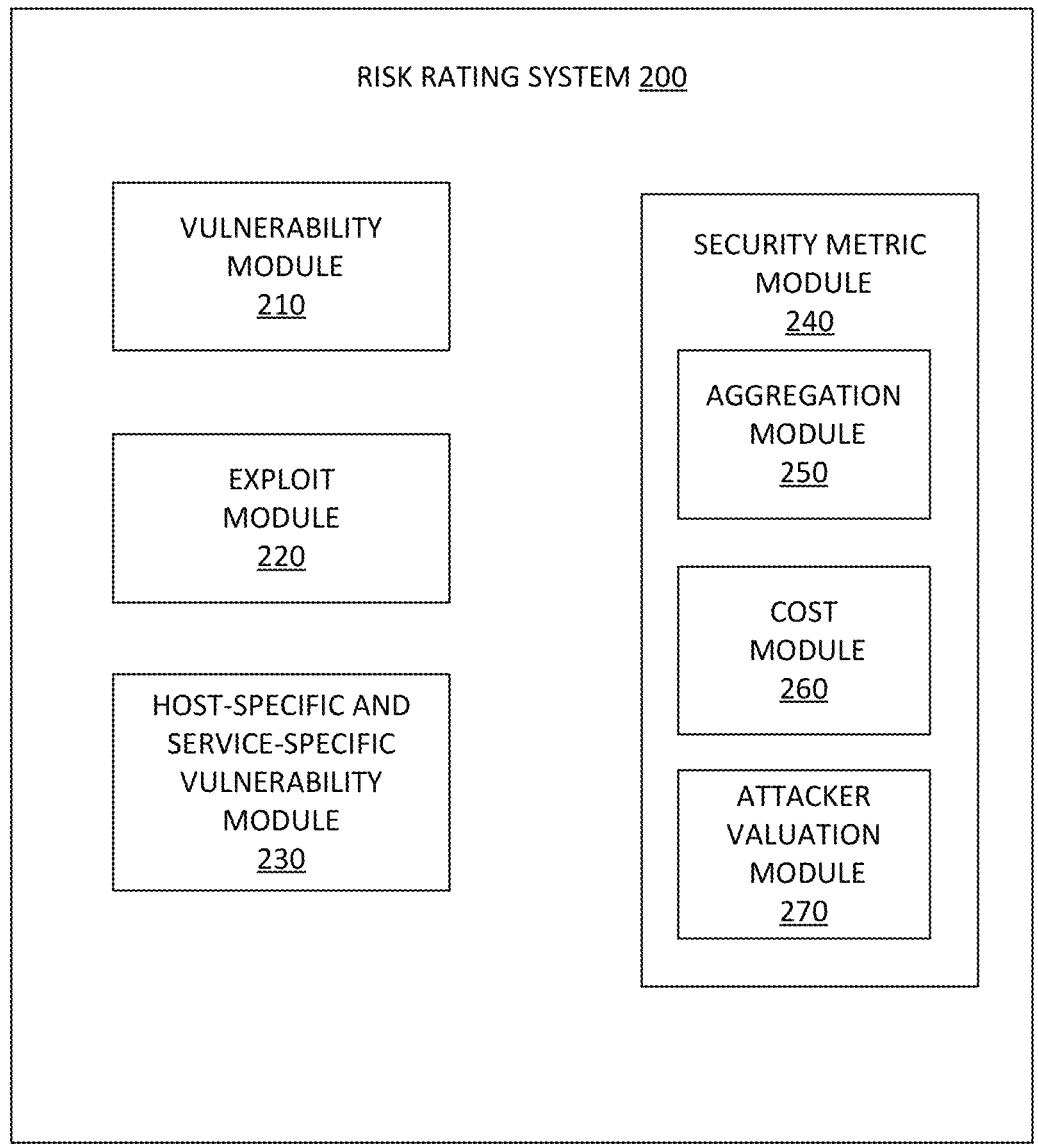
FIG. 2 is a block diagram showing the risk rating system implemented in modules, according to an example embodiment.

FIG. 2 is a block diagram showing a risk rating system 200 implemented in modules, according to an example embodiment. The modules may include a vulnerability module 210, an exploit module 220, a host-specific and service-specific vulnerability module 230, a security metric module 240, an aggregation module 250, a cost module 260, and an attacker valuation module 270. One or more of the modules of system 200 may be implemented in one or both of device 1910 and/or server 1920 of FIG. 19. The modules may include various circuits, circuitry and one or more software components, programs, applications, or other units of code base or instructions configured to be executed by one or more processors included in device 1910 or server 1920. Although modules 210, 220, 230, 240, 250, 260 and 270 are shown as distinct modules in FIG. 2, it should be understood that modules 210, 220, 230, 240, 250, 260 and 270 may be implemented as fewer or more modules than illustrated.

In one embodiment, vulnerability module 210 may be a hardware or software implemented module configured to generate a vector space of vectors associated with a set of characteristics for known software vulnerabilities, and to group the vulnerabilities into one or more sets of similar software vulnerabilities based on the similarities between the corresponding vectors. In some embodiments, the vulnerability module 210 is configured to retrieve data, such as but not limited to NVD-based data, relating to known software vulnerabilities from third party data sources and analyze the data to generate the vector space. In some embodiments, the analysis may include natural language processing of vulnerability descriptions found in the NVD.

The software vulnerabilities in the generated vector space may be grouped into sets of similar software vulnerabilities using a number of different approaches. Embodiments may utilize spectral clustering, a neural network, logistic regression analysis, partial least squares, a recommender system, random decision forests, least squares linear decision analysis, and other forms of supervised or unsupervised machine learning classifying together items which are close together in a relevant feature space or satisfy another criteria.

The exploit module 220 may be a hardware or software implemented module configured to determine the applicability of known exploits to the sets of similar software vulnerabilities and to determine a risk rating for each set of similar software vulnerabilities based on one or more exploits being applicable to at least one of the vulnerabilities in the set. The known exploits are exploits that are known to have actually occurred "in the wild", in other words non-theoretical exploits. In some embodiments, the exploit module is configured to retrieve data relating to known exploits from third party data sources. In one embodiment, the applicability of the known exploits to the sets of similar software vulnerabilities is determined by first generating a vector space based on the known exploit data.

The host-specific and service-specific vulnerability module 230 may be a hardware or software implemented module configured to analyze particular hosts/services to identify software vulnerabilities within the host, compare the host-specific/service-specific vulnerabilities to the sets of similar software vulnerabilities identified by the vulnerability module 210, and determine a risk rating for each of the host-specific/service-specific vulnerabilities using the previously determined risk rating for the set of similar software vulnerabilities.

The security metric module 240 may be a hardware or software implemented module configured to determine a security metric for the host (or service). The security metric may be generated as the result of an aggregation of risk rating values of host-specific/service-specific vulnerabilities. Alternatively the security metric may represent an estimated value of a return on investment (ROI) for an attacker exploiting a host-specific/service-specific vulnerability and may be generated with the aid of cost module 260 and attacker valuation module 270.

The aggregation module 250 may be a hardware or software implemented module called by the security metric module 240 and may be configured to aggregate the risk rating vulnerabilities for each of the host-specific/service-specific software vulnerabilities in order to generate a security metric for the host/service.

The cost module 260 may be a hardware or software implemented module configured to determine a cost to an attacker of exploiting a particular type of software vulnerability.

The attacker valuation module 270 may be a hardware or software implemented module configured to identify a value of the host to the attacker.

The security metric module 240 may generate the security metric for the host/service based on the value of the host and the cost to the attacker provided by the cost module 260 and attacker valuation module 270. In one embodiment, the security metric may be generated by dividing the value of the host by the cost of an exploit to an attacker as explained further below.

Figure 3:
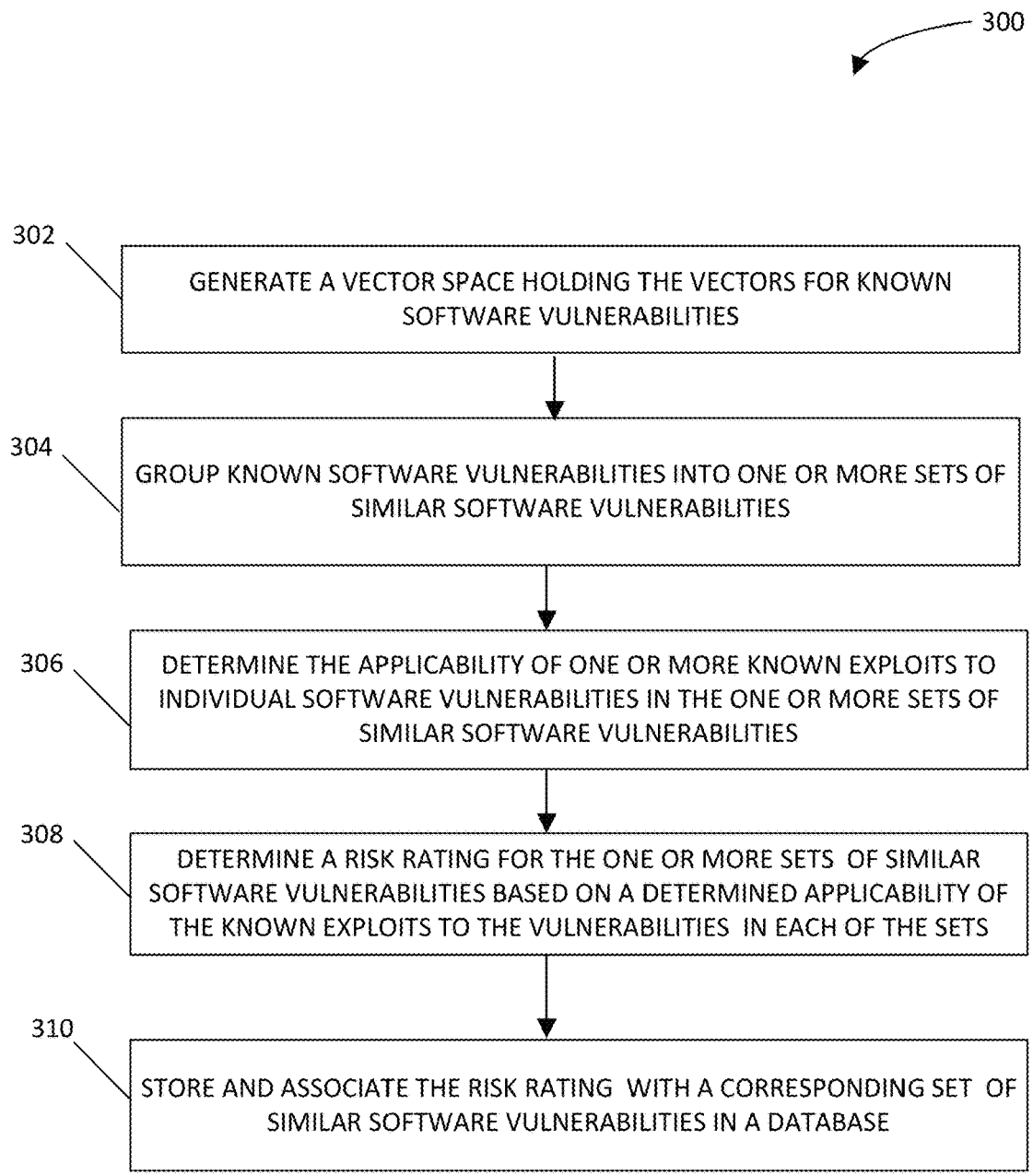
FIG. 3 is a flowchart showing an exemplary method for determining a risk rating for software vulnerabilities, according to an example embodiment.

FIG. 3 is a flowchart showing an exemplary method 300 for determining a risk rating for software vulnerabilities, according to an example embodiment. The steps of method 300 may be performed by one or more modules of system 200 shown in FIG. 2. The method 300 is a network-independent method of analyzing known software vulnerabilities and determining a risk rating for them using known exploit data.

At step 302, the vulnerability module 210 generates a vector space holding vectors for known software vulnerabilities, where each vector is associated with a set of characteristics of a corresponding known software vulnerability. In an example embodiment, the data related to known software vulnerabilities is retrieved from a third party source. In an embodiment, the characteristics are measurement dimensions used to form a CVSS base score for a software vulnerability. For example, the six measurement dimensions of CVSS version 2 or the 8 dimensions of CVSS version 3.

At step 304, the vulnerability module 210 groups one or more sets of similar software vulnerabilities in the vector space. In one embodiment, the grouping is performed using a distance metric and applying spectral clustering. In an example embodiment, the distance metric is a Jaccard distance where the number of vector elements that are similar between two or more vectors is counted and the spectral clustering is performed using k-means clustering. Exemplary details of this step are discussed further below.

At step 306, the exploit module 220 determines the applicability of one or more known exploits to the individual software vulnerabilities associated with the vectors in the one or more sets of similar software vulnerabilities.

At step 308, the exploit module 220 determines a risk rating for the one or more sets of similar software vulnerabilities based on a determined applicability of the known exploits to the vectors in each of the sets of similar vulnerabilities. In an example embodiment, the risk rating for each set of similar software vulnerabilities is calculated based on the number of exploits associated with a given set.

At step 310, the exploit module 220 stores and associates the risk rating with a corresponding set of similar software vulnerabilities in a database (e.g., database(s) 1950).

Figure 4:
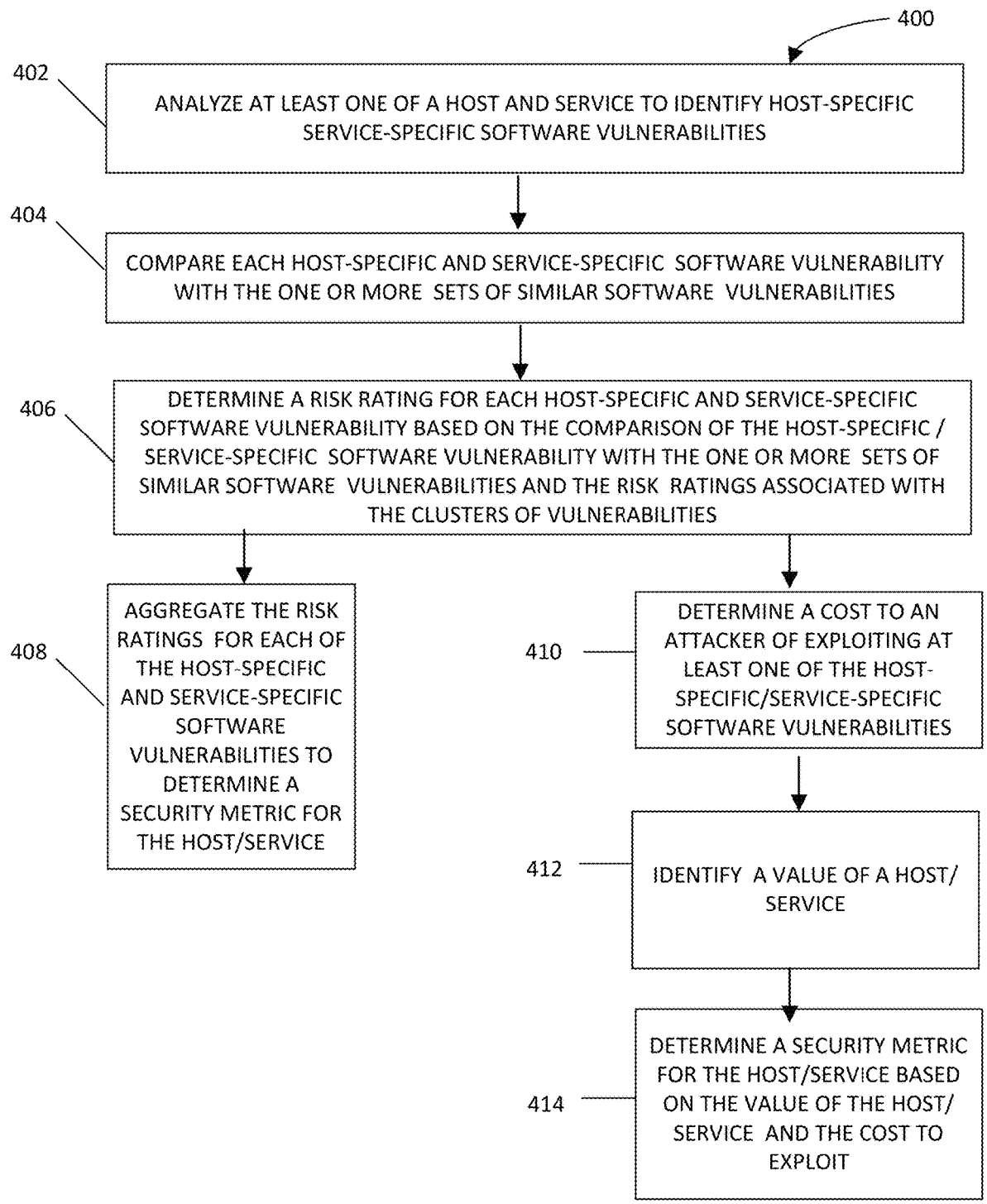
FIG. 4 is a flowchart showing an exemplary method for determining a security metric for a host, according to an example embodiment.

FIG. 4 is a flowchart showing an exemplary method 400 for determining a security metric (a value measurement) for a host or service, according to an example embodiment. The steps of method 400 may be performed by one or more modules of system 200 shown in FIG. 2. The method 400 is a network-specific method of analyzing hosts and/or services on an enterprise network for software vulnerabilities and determining a related security metric. For example, exemplary hosts and services that may be examined for software vulnerabilities may include but are not limited to, a server, a printer, a router, Internet of things devices, a personal computer running a common operating system such as MS Windows or Apple iOS, a set of virtual machines (VMs) running under a hypervisor, an operating system such as Linux, a browser such as Firefox™, and file-sharing services such as Samba™.

At step 402, the host-specific and service-specific vulnerability module 230 analyzes hosts/services in an enterprise network to identify host-specific software/service-specific vulnerabilities. In an example embodiment, a host server is analyzed using a third party scanning system to identify the host-specific software vulnerabilities.

At step 404, the host-specific and service-specific vulnerability module 230 compares each host-specific/service-specific software vulnerability identified via the scan with the sets of similar software vulnerabilities to determine which vulnerabilities on the host are present in which set.

At step 406, the host-specific and service-specific vulnerability module 230 determines a risk rating for each host-specific/service-specific software vulnerability based on the risk ratings for the identified set of similar software vulnerabilities.

Once the risk ratings have been determined for each software vulnerability identified on a host/service, the system may take a number of additional actions in order to estimate host/service risk. In one embodiment, at step 408, the risk ratings for each vulnerability on the host/service are aggregated as a complementary product to determine a security metric for the host. For example, the aggregation may be represented as:

$$P_{CompromisedHost} = 1 - \Pi_{v \in Vulns}(1 - P_{compromise}(v))$$

However, such an approach would apply to a random set of attackers choosing independent uncorrelated attack vectors and may not be realistic in many scenarios.

Accordingly, in another embodiment, at step 410, the cost module 240 determines a cost to an attacker of exploiting at least one of the host-specific/service-specific software vulnerabilities. In an example embodiment, the cost module 240 identifies one or more exploits applicable to one of the host-specific/service-specific software vulnerabilities, and the cost of exploiting the corresponding host-specific/service-specific software vulnerability is determined based on cost information of the exploits retrieved from third party data sources (e.g., third party exploit database(s) 1940). Sometimes a vulnerability may have more than one applicable exploit, in which case, in one embodiment, the cost of the cheapest exploit may be used to assign a cost to exploit the vulnerability. In another embodiment, the most widely available exploit may be used to assign a cost to exploit the vulnerability. In an alternative embodiment, the cost of exploiting a vulnerability is based on the amount of time needed to be expended by the attacker to exploit the vulnerability. In another embodiment, the cost of exploiting the vulnerability is based on enumerating a cost of obtaining root access through all possible paths made available via the particular vulnerability, choosing the cheapest one and utilizing that cheapest approach as the measure of risk.

At step 412, the attacker valuation module 250 identifies a value of the host/service to the attacker. In some embodiments, the host/service value may be pre-assigned based on the type of host or service. For example, in one embodiment, the host value is pre-defined based on the value of the assets connected to the host or stored at the host, a type of operation performed by the host or some other criteria such as, but not limited to, the importance of the host in supporting an essential mission For example, a share-point server may be assigned a higher host value than an unused laser printer.

At step 414, the security module 260 determines a security metric for the host/service by dividing the host/service value by the corresponding cost of exploiting the host-specific/service-specific vulnerability. The quotient thus obtained may become the measure of risk for the host/service. Generated in this manner, the security metric represents the likely return on investment for an attacker of the host. The greater the value and the lower the cost, the more likely it is that an attacker may attack the host through one of its vulnerabilities. Armed with these security metrics for the different hosts and services in an enterprise network, the individuals tasked with cyber defense may better focus their protection efforts by focusing on the most likely avenues of attack.

Exemplary operations to identify risk ratings for software vulnerabilities and to determine host-specific/service-specific security metrics described in FIGS. 3 and 4 above are now described in greater detail.

Exemplary Similarity Calculation and Clustering and Use of Exploit Data

As noted above, embodiments may use spectral clustering or other techniques to group software vulnerabilities into one or more sets of similar software vulnerabilities. A discussion of a clustering approach follows below but the concepts discussed should be understood to be applicable to other grouping techniques.

Embodiments may cluster similar potential software vulnerabilities together in a vector space and the prevalence of known exploits associated with the vulnerabilities in the cluster may be determined as a means for assigning a risk rating to different clusters of similar software vulnerabilities. Conventional vulnerability detection practice has been to rank vulnerabilities by danger according to their CVSS score. For example, the CVSS base score (version 2) may be calculated from six measurement dimensions of each vulnerability, which are created by a human analyst/subject matter expert (SME) when a vulnerability is entered into the NVD database. These measurement dimensions are broken into two parts: exploitability ease (which is further divided into access vector, access complexity, and authentication); and impact (which is divided into confidentiality, integrity, and availability). Each dimension is limited to one of three possible levels. The access dimension reflects how the vulnerability is exploited. The possible values for this metric are Local, Adjacent, or Network. The more remote an attacker can be to attack a host, the greater the vulnerability score. The access complexity metric measures the complexity of the attack required to exploit the vulnerability once an attacker has gained access to the target system. The lower the required complexity, the higher the vulnerability score. The authentication dimension measures the number of times an attacker must authenticate to a target in order to exploit a vulnerability. This metric does not gauge the strength or complexity of the authentication process, only that an attacker is required to provide credentials before an exploit may occur. The fewer authentication instances that are required, the higher the vulnerability score. Impact measures the effect of the vulnerability across the dimensions of confidentiality, integrity, and availability of data. For example, ransomware effects either confidentiality or availability, but not integrity. Again, the possible values are limited to three: none, partial, or complete. Table 1, below, presents the dimensions and possible values.

In other versions, the CVSS score may have more than six dimensions. For example, version 3 of the CVSS base score is calculated from eight dimensions. The conventional CVSS base score is calculated from these dimensions using fixed coefficients.

Embodiments improve upon this conventional practice using a number of network-independent and network-specific techniques. For example, rather than using human-defined fixed coefficients, the risk rating system of the present disclosure explores the latent structure of a vector space describing known software vulnerabilities using similarity calculation and grouping similar vulnerabilities sets of similar software vulnerabilities.

In an example embodiment, the vector space is generated based on a set of characteristics describing the software vulnerabilities. These characteristics may be retrieved from the NVD database or may be the measurement dimensions of the CVSS score. Alternatively, in another example embodiment, the vector space may be generated based on natural language processing of a description of the software vulnerability. Following the generation of the vector space, a distance metric may be defined, and then clusters of software vulnerabilities in the vector space identified. In an example embodiment, the distance metric is a Jaccard distance, which counts the number of vector elements that are the same among the vectors in the vector space. Spectral clustering is then performed, using the eigenvectors of the similarity matrix of the data and clustering in this eigenspace. In one embodiment, K-means clustering is employed. Exemplary details of this approach are provided below.

As discussed above, conventional CVSS scores are a poor measure of risk and do not take into consideration which vulnerabilities have actually been exploited versus those that are potentially exploitable but have not yet been exploited. To address this issue, embodiments use available known exploit data to assign risk to clusters of software vulnerabilities identified by the system. Exploits are not distributed evenly among the clusters of software vulnerabilities. Some clusters have more exploits applicable to the cluster than others. The risk rating system utilizes the prevalence of exploits for a given cluster as the metric of risk for all vulnerabilities in that cluster. Among other benefits, this allows vulnerabilities which are similar to ones which have known exploits, but for which exploits in the wild have not yet appeared, to be marked as risky. In an example embodiment, the risk is calculated as the fraction of vulnerabilities in a cluster which have at least one associated known exploit. In other embodiments, other exploit-based weighting schemes may be used.

Known software vulnerabilities are assigned a CVSS base vector when they are added to the NVD. The CVSS base vectors version 2 are comprised of six metrics of three categories that are assigned ordinal values by analysts. The categories, metrics, and values are provided below in Tables 1 and 2. Each metric's values are given from least to most dangerous in all cases. These vectors are converted into the CVSS score $v \in [0,10]$ for vulnerability assessment.

TABLE 1

Access Metrics and labels from the NVD

| Metric (Label) | Value (Label) |
| --- | --- |
| Attack Vector (AV) | Local Access (L) |
|  | Adjacent Network (A) |
|  | Network (N) |
| Access Complexity (AC) | High (H) |
|  | Medium (M) |
|  | Low (L) |
| Authentication (Au) | None Required (N) |
|  | Requires Single (S) |
|  | Requires Multiple (M) |

TABLE 2

Impact Metrics and labels from NVD.

| Metric (Label) | Value (Label) |
| --- | --- |
| Confidentiality Impact (C) | None (N) |
|  | Partial (P) |
|  | Complete (C) |
| Integrity Impact (I) | None (N) |
|  | Partial (P) |
|  | Complete (C) |
| Access Impact (A) | None (N) |
|  | Partial (P) |
|  | Complete (C) |

Alternatively, CVSS score version 3 can be used instead of version 2. CVSS version 3 is an upgrade to version 2 which does not alter its essential character.

In embodiments, an exemplary data source for known software vulnerabilities includes the NVD. The NVD is the U.S. government repository for known and accepted software vulnerabilities maintained by the National Institute for Standards and Technology (NIST). Each vulnerability is given a set of analyst-assigned ratings (the CVSS vector) that is used to compute the CVSS base score.

In embodiments, an exemplary data source for known exploits is the Exploit Database (Exploit-DB). This is a robust database containing a large collection of vulnerabilities and their corresponding publicly available exploits.

In another example embodiment, a data-driven approach links CVSS scores to exploit existence. In particular, embodiments develop probabilities of exploit existence conditioned on unit CVSS score ranges. To compute the conditional probabilities, the below equation 1 may be used, which is the definition of conditional probability:

$$P(A \mid B) = \frac{P(A \cap B)}{P(B)} \quad \text{Equation 1}$$

where A is the event that an exploit exists for a particular vulnerability, and B is the event that a vulnerability has an associated CVSS score $v \in [V_{Lo}, V_{Hi}]$. Then P(B) is computed by accumulating the total number of vulnerabilities that have CVSS scores in that range, and P(A∩B) is computed by accumulating the total number of scores in that range that also have known exploits, each of which is divided by the total number of known vulnerabilities.

Tacit in the construction of these probabilities are several assumptions. Namely, that the NVD information enumerates the entire "universe" of vulnerabilities and that available exploit databases account for all known exploits (at the time of database construction). Additionally, only the existence of an exploit's association with a vulnerability is queried. However, some vulnerabilities have many associated exploits; and it will be appreciated that the threat presented to these vulnerabilities may be higher. Additionally, many exploits exist without associated vulnerabilities. In an example embodiment, these unassociated exploits are unaccounted for in the discovered probabilities above.

It should be appreciated that not all vulnerabilities have a known exploit. Only a small percentage of the vulnerability entries in some datasets have an associated exploit, implying that there a great deal of known vulnerabilities that have no documented exploits against them. For example, only 9.2% of vulnerabilities with CVSS scores $v \in [9,10]$ have known exploits. The conditional probabilities of an exploit existing given a CVSS score $v \in [V, V+1]$, where V ranges from 0 to 9 may be determined and the data presented alongside a curve-fit to a generic function of the form $f(v) = c + \alpha v^b$. Under this restriction, the functional probability fit, $$p(v) = 0.01 + 0.18 \left(\frac{v}{10}\right)^{7.51}$$

where $v \in [V, V+1]$ and $V \in \{0, 1, \ldots, 9\}$, equation 2 emerges between the exploit probability and the CVSS score falling into a unit score window.

Table 3 below provides the values and standard deviations for exemplary curve fit parameters, indicating that the relative standard deviations are in the range of 17% to 24% of their stated estimates.

TABLE 3

Curve fitting coefficients and standard deviations for exploit probabilities conditioned on CVSS scores.

| p (v), $c + av^b$ | Value | Standard Deviation | Frac. Standard Deviation |
| --- | --- | --- | --- |
| c | 0.01 | 0.0024 | 0.24 |
| a | 0.18 | 0.031 | 0.17 |
| b | 7.51 | 1.39 | 0.18 |

Described below are exemplary datasets and analysis of the feature space created by the vectors in an embodiment. A mathematical analysis of the latent structure created by the known software vulnerabilities via spectral clustering with k-means is provided.

Each of the six metrics of the CVSS version vector contain one of three ordinal values, but there is not a real-valued distance between them. Instead of distance, the risk rating system described herein computes similarity using a fixed-position Jaccard similarity score for every pair of unique vector. This similarity between two ordinal-valued vectors $C = [c_1, \ldots, c_n]^T$ and $D = [d_1, \ldots, d_n]^T$ is given by:

$$J(C, D) = \sum_{i=1}^{n} \frac{|\{c_i\} \cap \{d_i\}|}{n} \quad \text{equation 3}$$

Here, $0 \leq J(C, D) \leq 1$, and $J(C, D) = 1$ if and only if the vectors have identical entries in every position. It should be noted that the labels defined in Tables 1 and 2 are not unique to each metric, but comparisons are only made between the two value entries of the same metric in each vector.

Using the similarity metric J(C, D), the similarity matrix is computed as $S \in \mathbb{R}^{283 \times 283}$ for the 283 unique vectors through a particular time point (e.g., 2015). Then, spectral clustering is applied to the similarity matrix, which uses a dimensionality reduction (taking only k leading eigenvalues) together with k-means clustering to discern clusters of similar vectors. By allowing the number of clusters, k, to vary as an input parameter, the highest intercluster similarity and lowest intracluster similarity is found with three clusters. To measure the error associated with each cluster choice, the root-mean-square (RMS) error of the similarity matrix from an ideal similarity matrix is computed as follows:

$$RMS_{similarity} = \frac{1}{n^2} \sqrt{\sum_{i=1}^{n} \sum_{j=1}^{n} (S_{i,j} - \chi_{i,j})^2} \quad \text{equation 4}$$

where $S_{i,j}$ is the similarity matrix entry at location (i, j) and the indicator variable $X_{i,j}$ represents an ideal similarity matrix (all unity intracluster entries and all zero intercluster entries), $$\chi_{i,j} = \begin{cases} 1 & \text{if } i, j \text{ are in the same cluster,} \\ 0 & \text{else.} \end{cases} \quad \text{equation 5}$$

Figure 5:
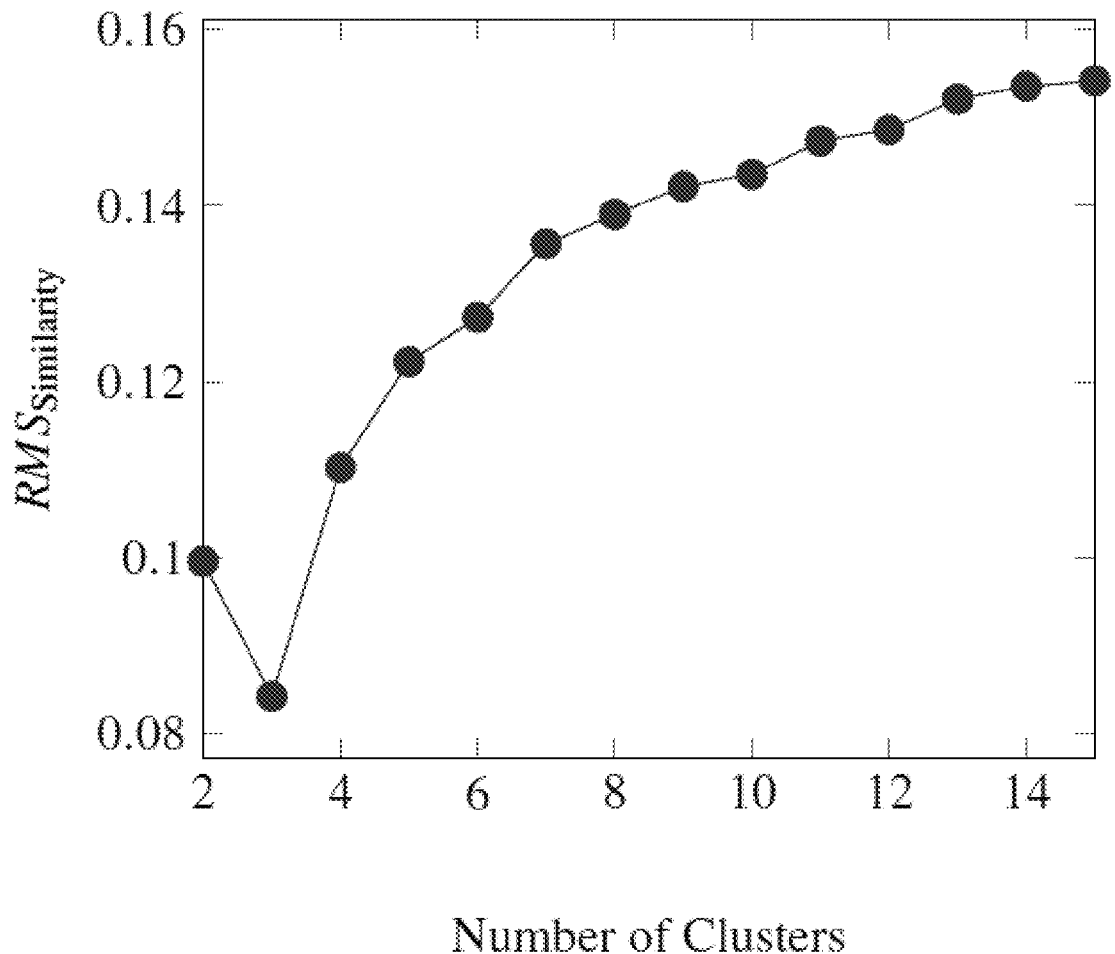
FIG. 5 depicts Root Mean Square (RMS) similarity value.
Figure 6:
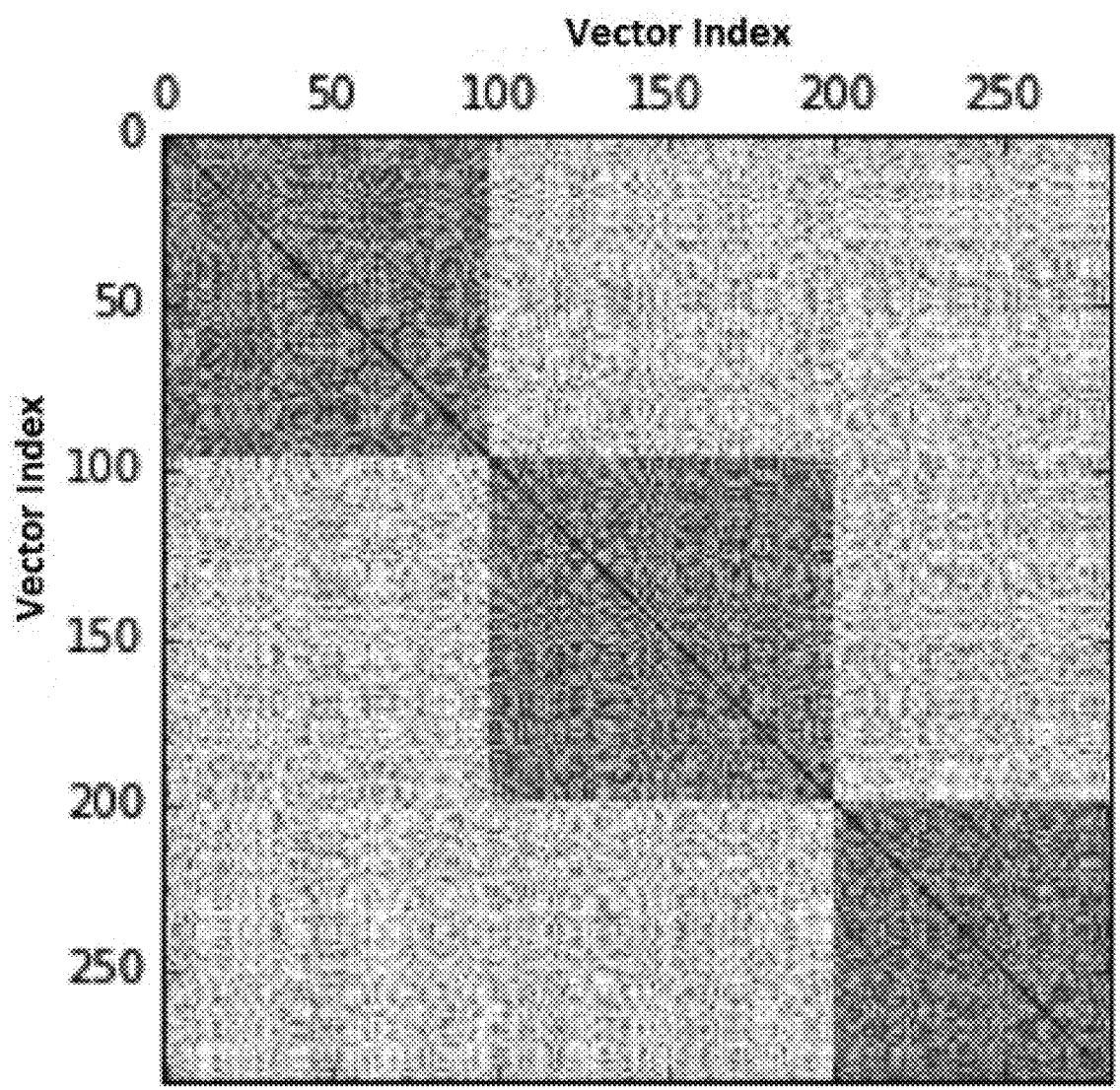
FIG. 6 depicts feature vectors with three clusters from Jaccard similarity arranged by cluster membership.

FIG. 5 depicts equation 4 over the choice of 2 to 15 clusters, which clearly indicates that the 3-cluster choice produces the least error. Error is minimized when the intracluster similarity is highest and the intercluster similarity is lowest, indicating the optimal cluster memberships. Because there are relatively few choices for the vectors, when the number of clusters is increased, the intercluster similarity is high, driving up the error. This is due to similar vectors being forced into different clusters. A representation of the clustering is given in FIG. 6. The rows and columns are shaded according to cluster membership, where the darker colors represent higher similarity.

Several observations can be made regarding the vectors generated via the risk rating system. The latent structure in the vulnerability ratings in the NVD leads to the three clusters optimally observed in the data. Table 4 depicts the cluster memberships across an at least six-characteristic vector positions. Some noteworthy latent features are that "Access Complexity" (AC) is nearly uniform across all three clusters, making it a poor discriminator, whereas "Authentication" (Au) is most severe in cluster 2, least in cluster 1, and moderate in cluster 0, which is indicated using boldface. Also seen is that the C/I/A values are tightly coupled for their lowest memberships—cluster 2 has very few medium scoring C/I/A entries, whereas clusters 0 and 1 have very few high-scoring entries, which is indicated with italics.

TABLE 4

Cluster membership fractions for CVSS v2 vectors in 3 clusters

| Cluster | Severity | AV | AC | Au | C | I | A |
|---|---|---|---|---|---|---|---|
| C0 | Low | 0.32 | 0.43 | 0.05 | 0.47 | 0.43 | 0.38 |
|  | Med | 0.21 | 0.35 | 0.95 | 0.35 | 0.40 | 0.34 |
|  | High | 0.47 | 0.22 | 0.00 | *0.18* | *0.18* | *0.28* |
| C1 | Low | 0.29 | 0.34 | 0.84 | 0.35 | 0.35 | 0.41 |
|  | Med | 0.22 | 0.36 | 0.16 | 0.56 | 0.63 | 0.48 |
|  | High | 0.49 | 0.31 | 0.00 | *0.09* | *0.02* | *0.11* |
| C2 | Low | 0.43 | 0.33 | 0.07 | 0.32 | 0.35 | 0.28 |
|  | Med | 0.24 | 0.34 | 0.11 | *0.09* | *0.06* | *0.02* |
|  | High | 0.33 | 0.33 | 0.82 | 0.60 | 0.59 | 0.70 |

Using these findings, the risk rating system provides actionable vulnerability rankings, by exploring a relaxation of the optimal clustering (FIG. 6) of the vector assignments by increasing the number of clusters. This reduces the intercluster similarity between the vectors, but the exploit density and emergence within a subset of the clusters is increased. To better rank vulnerabilities, the risk rating system identifies vulnerability vectors that are closely associated, now or in the future, with high risk. As discussed above, the existence and emergence of exploits is taken as proxy for risk. For the cluster rankings, exploit data from third party sources is used and associated with appropriate vulnerability vectors. Using this technique, the risk rating system described herein prioritizes patching vulnerabilities with known exploits associated with their vulnerability vector. The clustering provided on the latent feature space also provides a mechanism for assessing and ranking the likelihood that future exploits may be developed for the currently known vulnerabilities.

The clusters within the vector space do not immediately provide a better ranking of vulnerabilities, as they merely model the latent relationship between the combinations of the ordinal values of the various CVSS metrics from NVD. To provide an actionable ranking, a partial ordering of vulnerabilities is imposed in the risk rating system. Although three clusters optimally describe the currently observed vectors, in an example embodiment this partitioning is not optimal for estimating the risk of the vulnerabilities in a system. Because the underlying clustering method is spectral and k-means, each value of k can nontrivially re-assign cluster memberships. With a careful choice of k, vector clusters are developed that are disproportionately affected by exploits as indicated by third party data sources, while also allowing for emergent vectors to be accurately incorporated into the risk rating system.

Figure 7:
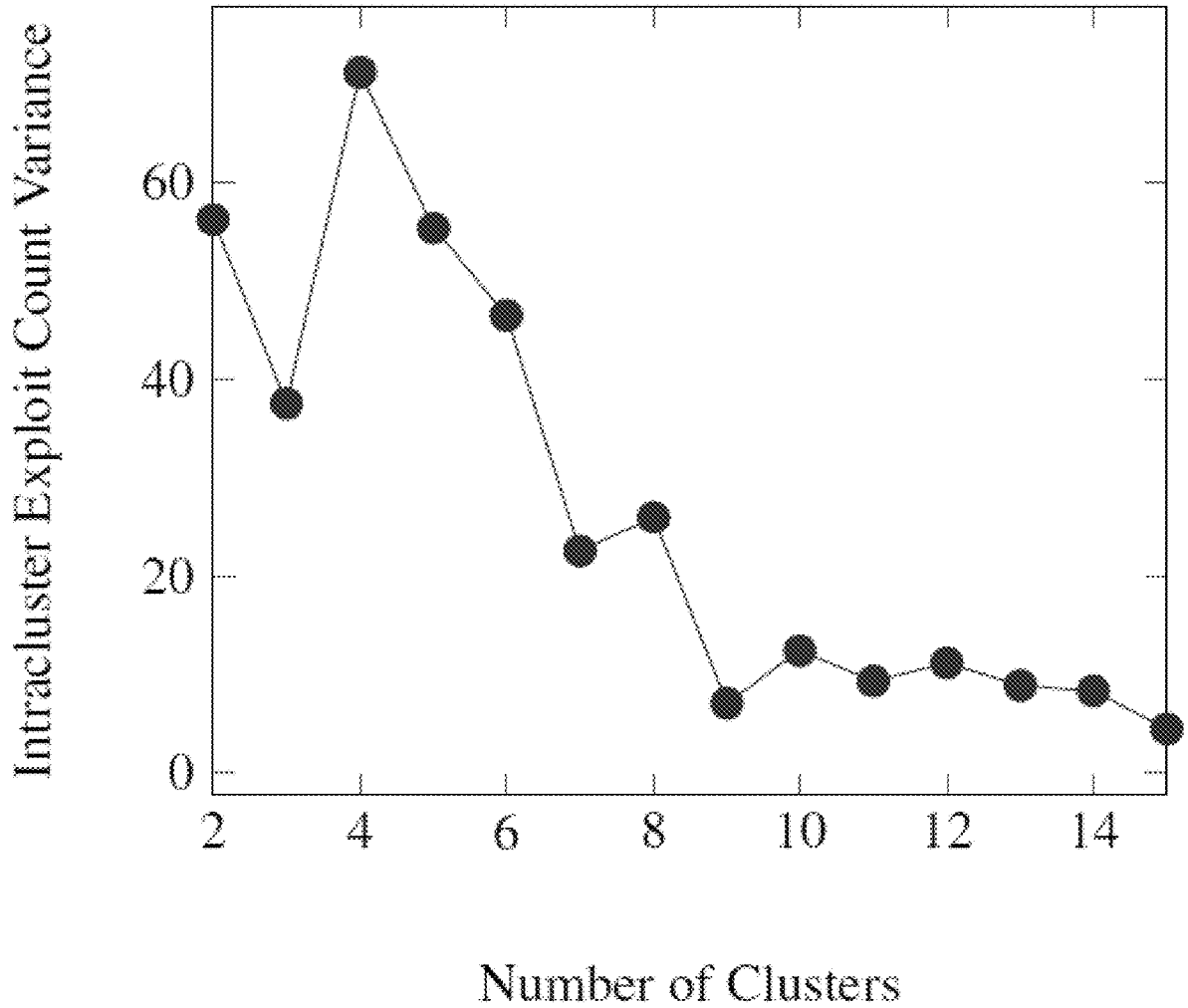
FIG. 7 depicts the intracluster exploit count variance per total number of vector clusters based on CVSS version 2.
Figure 8:
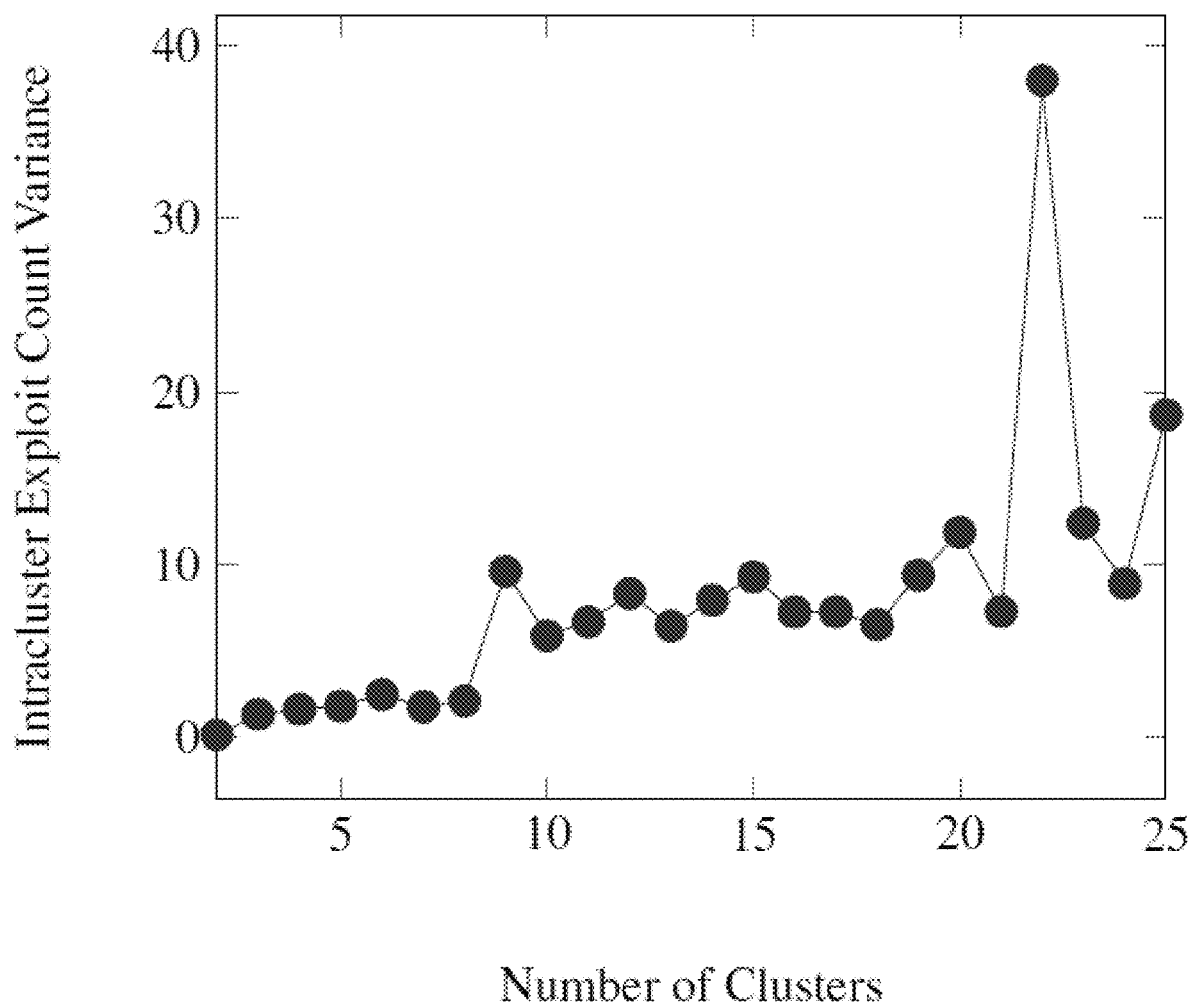
FIG. 8 depicts the intracluster exploit count variance per total number of vector clusters based on CVSS version 3.

There are two metrics and a principle that are used to determine the number of clusters for the risk rating system described herein. First given k clusters, FIG. 7 shows the intracluster exploit count variance per total number of vector clusters based on CVSS version 2 scores while FIG. 8 shows the intracluster exploit count variance per total number of vector clusters based on CVSS version 3 scores. In other words, it is a measure of how different the number of exploits is between the clusters. Having a cluster assignment where this variance is very low implies that the exploits are essentially randomly distributed throughout the clusters. This scenario is no better than randomly choosing to patch software vulnerabilities. Conversely, when the variance is high, this shows that some clusters contain significantly more (fewer) exploits than others, and patching the vulnerabilities associated with those vectors may be given higher (lower) priority.

Figure 9:
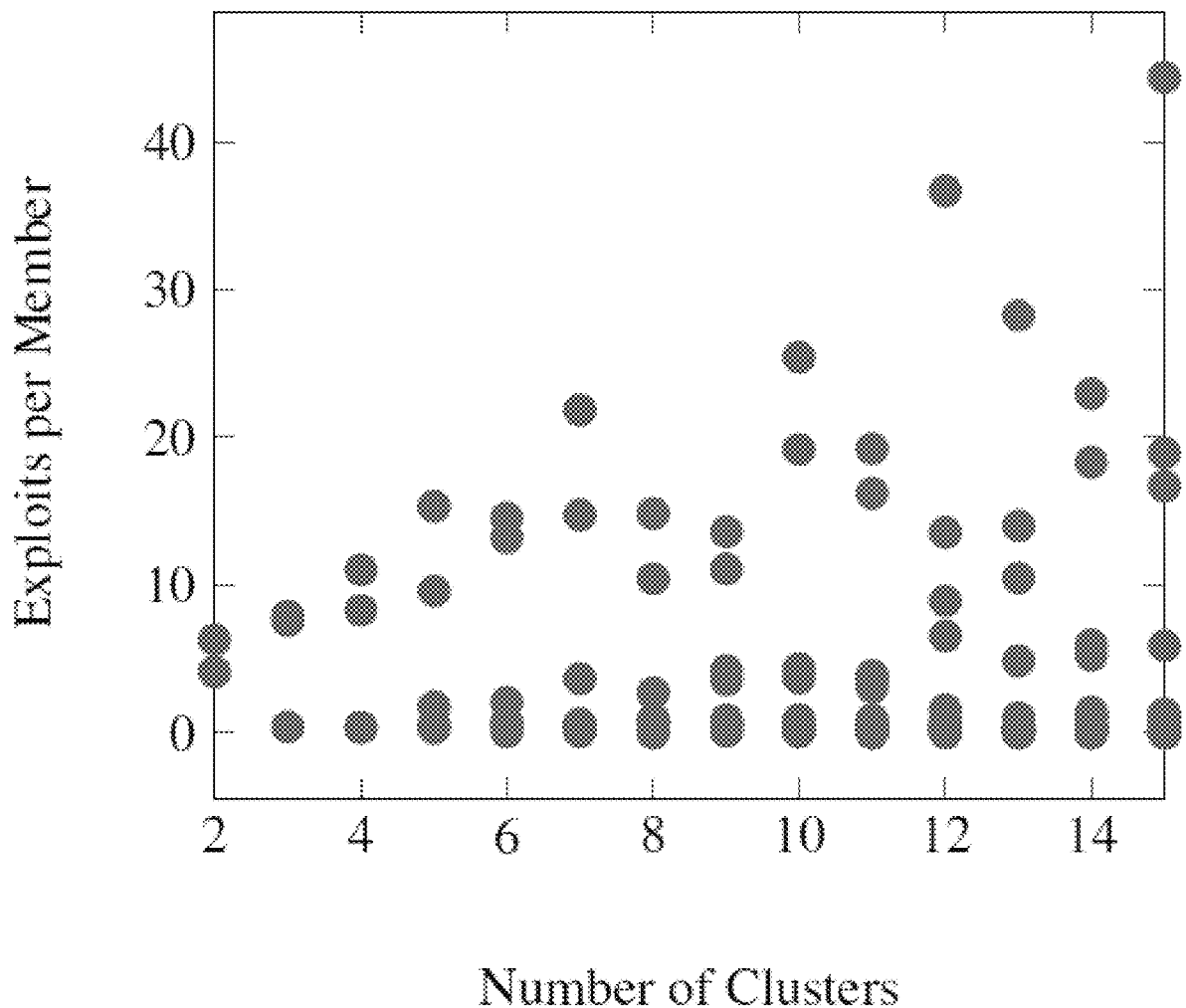
FIG. 9 depicts the average number of exploits per vulnerability for each vector cluster based on CVSS version 2.
Figure 10:
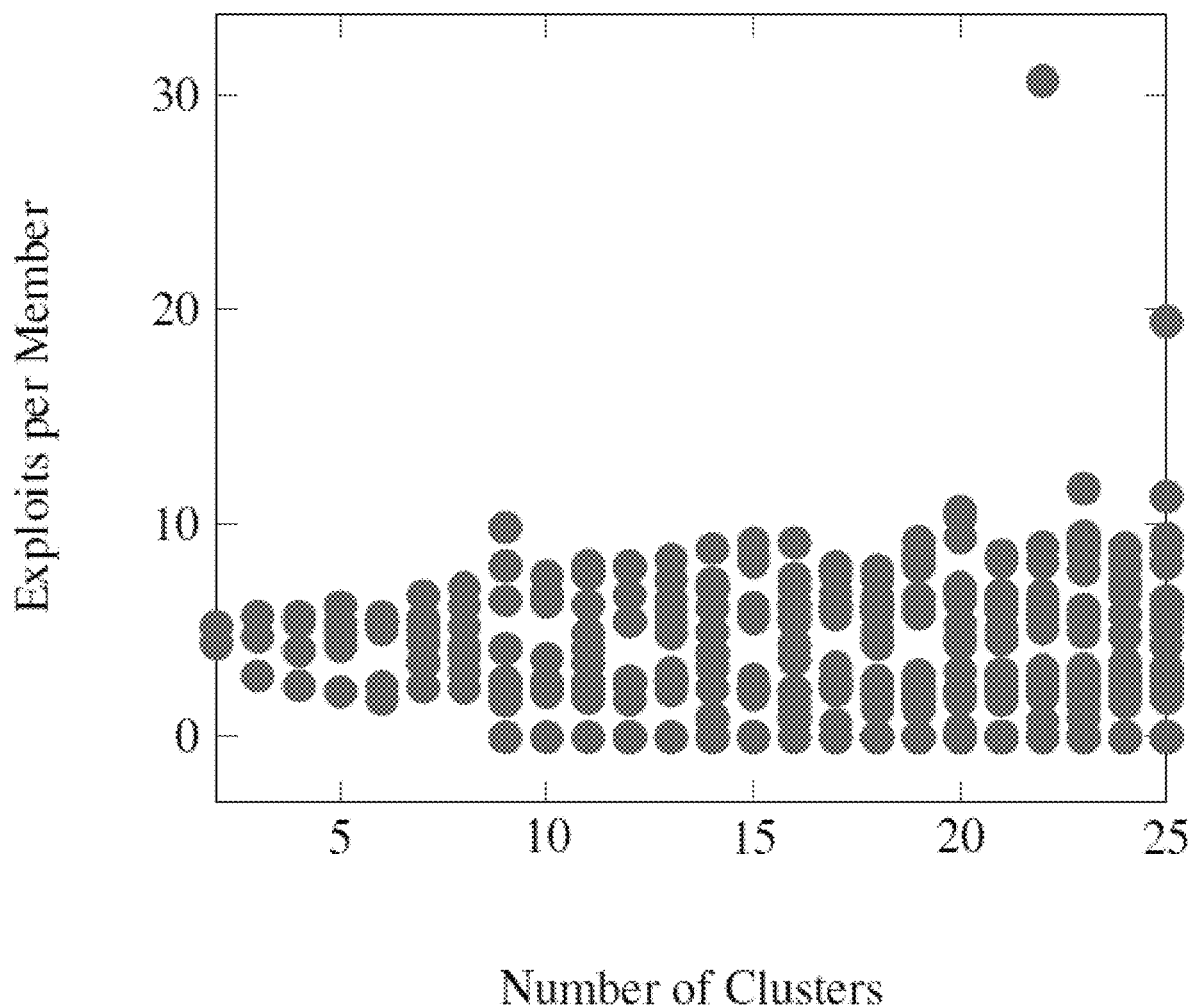
FIG. 10 depicts the average number of exploits per vulnerability for each vector cluster based on CVSS version 3.

The number of exploits per cluster member to determine which clusters are most highly exploited is also significant. FIG. 9 presents the average number of exploits per vulnerability for each vector cluster based on CVSS version 2 while FIG. 10 presents the average number of exploits per vulnerability for each vector cluster based on CVSS version 3. This averaging metric is also used to find clusters where exploits are more or less dense. Having a large exploit-to-vector ratio is desirable, but the cluster sizes need to be non-trivial due to one last consideration. The final consideration made is the ability to use the principle of transduction. Transduction leverages known latent information in one space to explain the latent behavior in another space. Here, the latent vector information is leveraged to explain the emergence of exploits. Transduction is achieved when the CVSS vectors with exploits are clustered with vectors that will develop exploits in the future. Choosing the number of clusters correctly drives this process. Too many clusters implies that vectors must be extremely similar to be in the same cluster, reducing the likelihood of associating exploited vulnerabilities with vulnerabilities that may be exploited in the future. Alternatively, choosing too few clusters closely associates more vectors together, driving up false positives.

FIGS. 8 and 10 depict the intercluster variance in exploits per member and the average number of exploits with respect to the total number of vector clusters based on the CVSS version 3 scores. Both of these figures indicate a generally rising variance with respect to cluster count, with notable jumps at 9, 22, and 25 clusters. FIG. 10 indicates that the 22-cluster choice is particularly compelling, as one of the clusters contains 30 exploits per member.

With the tuning considerations discussed above, in one embodiment, the risk rating system employs a cluster-based vulnerability ranking algorithm functioning as expressed below. The underlying clustering method is very fast, allowing the algorithm implemented in the risk rating system to scale and deploy on computationally restrictive environments.

Input:
Vulnerabilities, exploit existence, the number of clusters k
1. Find all unique vectors in the vulnerability database
2. Compute the Jaccard similarity between all pairs to create the similarity matrix, S
3. Apply spectral clustering with k-means on S to provide k-many clusters
4. Count the number of exploits affecting each vector in each cluster
5. Rank the clusters from 1 to k where k has the most exploits
Output:
The vulnerabilities corresponding to the vectors in clusters ranked from k to 1.

To avoid re-computation of the clusters after the addition of a new vulnerability, the cluster-based method implemented in the risk rating system can be also used in pseudo-online environments. In an example embodiment, once the above algorithm is completed, a central server may send the cluster memberships to many hosts, and the computation performed at the host level is minimal. The length of time between updates can be instantaneous when a new vulnerability is observed or many weeks into the future. In an example embodiment, the risk rating system is updated on a regular basis.

Figure 11:
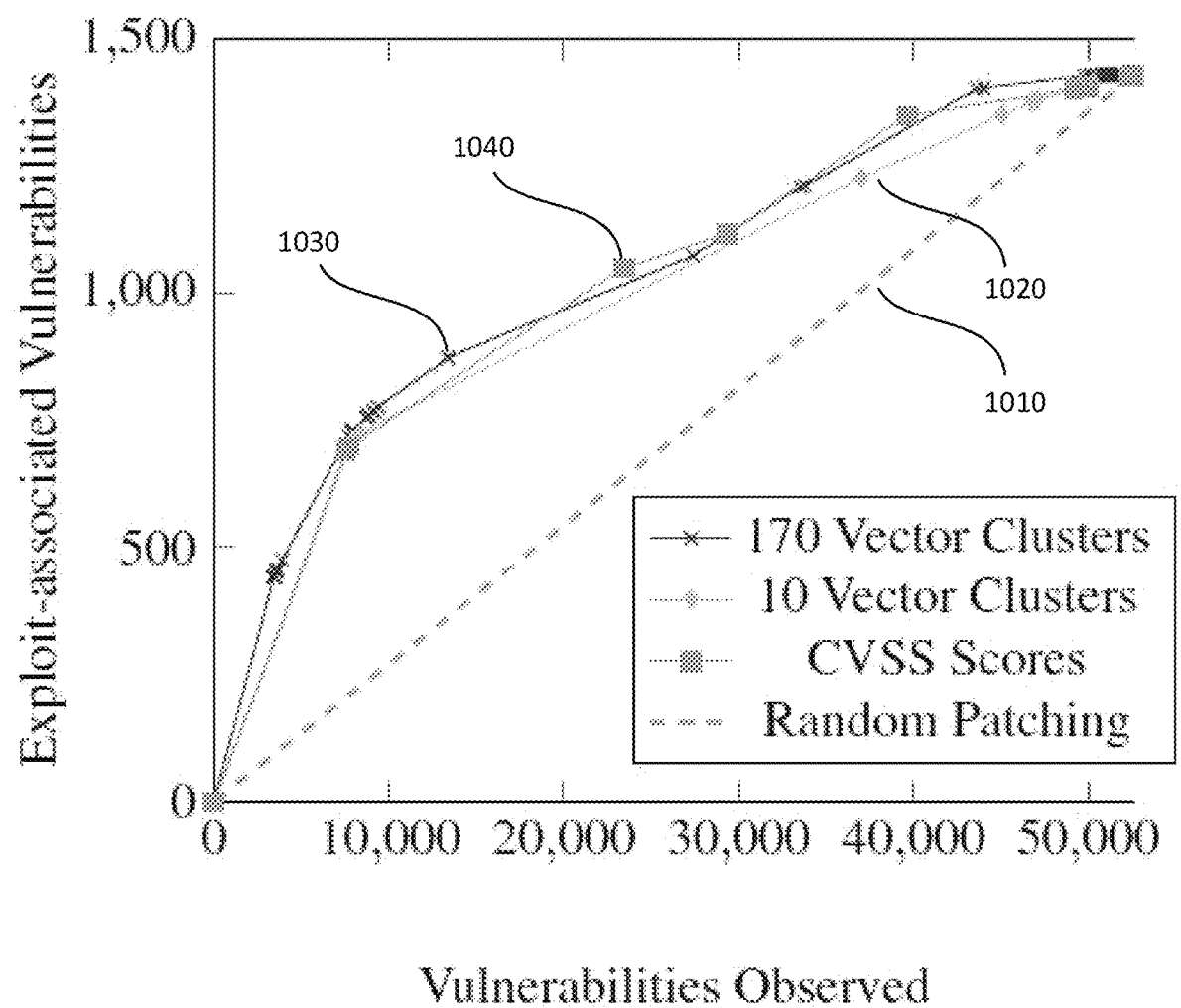
FIG. 11 depicts a chart presenting exploit-associated vulnerabilities versus known vulnerabilities for various k-clusters and CVSS version 2 scores.
Figure 12:
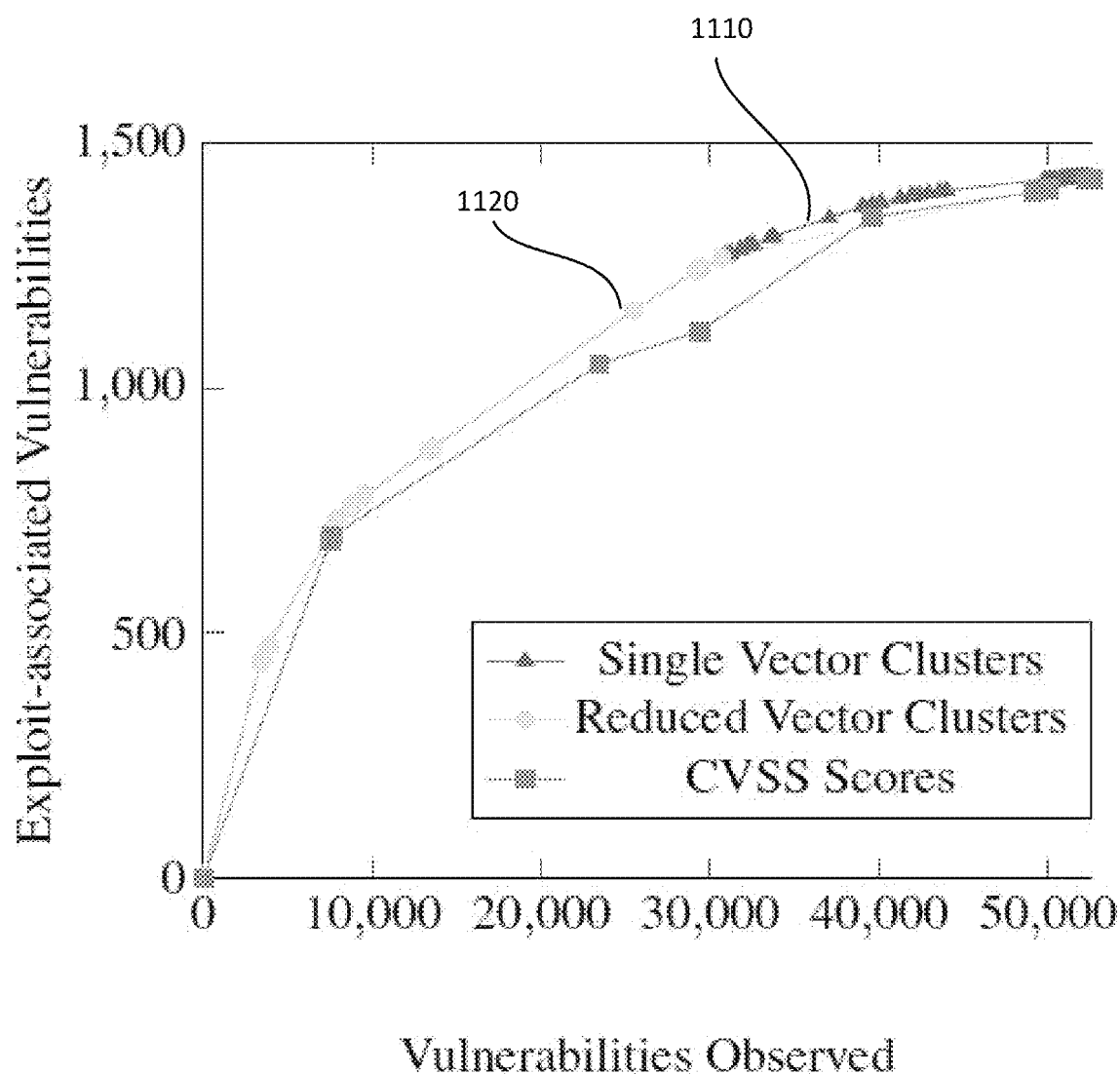
FIG. 12 depicts a chart presenting exploit-associated vulnerabilities versus known vulnerabilities for various k-clusters and CVSS version 2 scores.

As an initial comparison of exploit emergence using vector clusters, FIGS. 11 and 12 depict examples of the relationships between the exploits that may be mitigated according to the rank orderings of the risk rating system inspired both by several cluster choices and CVSS scoring across the entire NVD. The "random patching" curve 1010 in FIG. 11 represents the simplest, least data-informed approach of vulnerability mitigation, implying that exploit-associated vulnerabilities are mitigated in the same proportion as the patched vulnerabilities. The maximal efficiency is obtained by "single vector clusters" (curve 1110 in FIG. 12), where each vector forms its own cluster. CVSS scoring is competitive, although FIG. 12 shows that a "reduced vector clusters" (curve 1120) approach (merging together the low-exploit vectors until 10 clusters remain) is both simpler and more predictive. The "10 vector cluster" (curve 1020) and "170 vector clusters" (curve 1030) in FIG. 11 represents two naturally emergent cluster approaches from the risk rating system's algorithm described above, with 10 clusters being competitive with CVSS scoring (curve 1040) and 170 surpassing it. As exploits are rare, even small algorithmic improvements in their detection is of significance.

Figure 13:
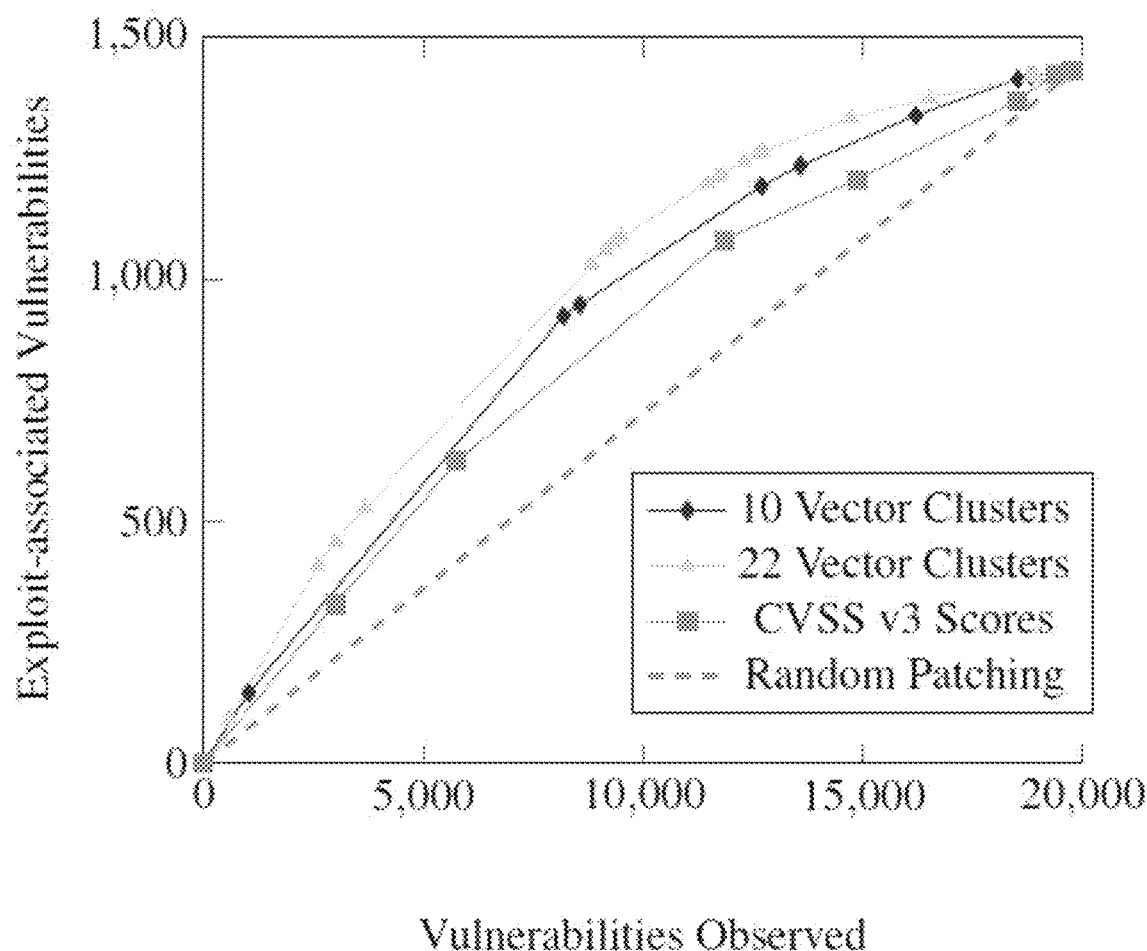
FIG. 13 depicts exploit-associated vulnerabilities versus known vulnerabilities for various k-clustering and CVSS version 3 scores.

FIG. 13 shows exemplary exploit-associated vulnerabilities versus known vulnerabilities for various k-clustering and CVSS version 3 scores.

Figure 14:
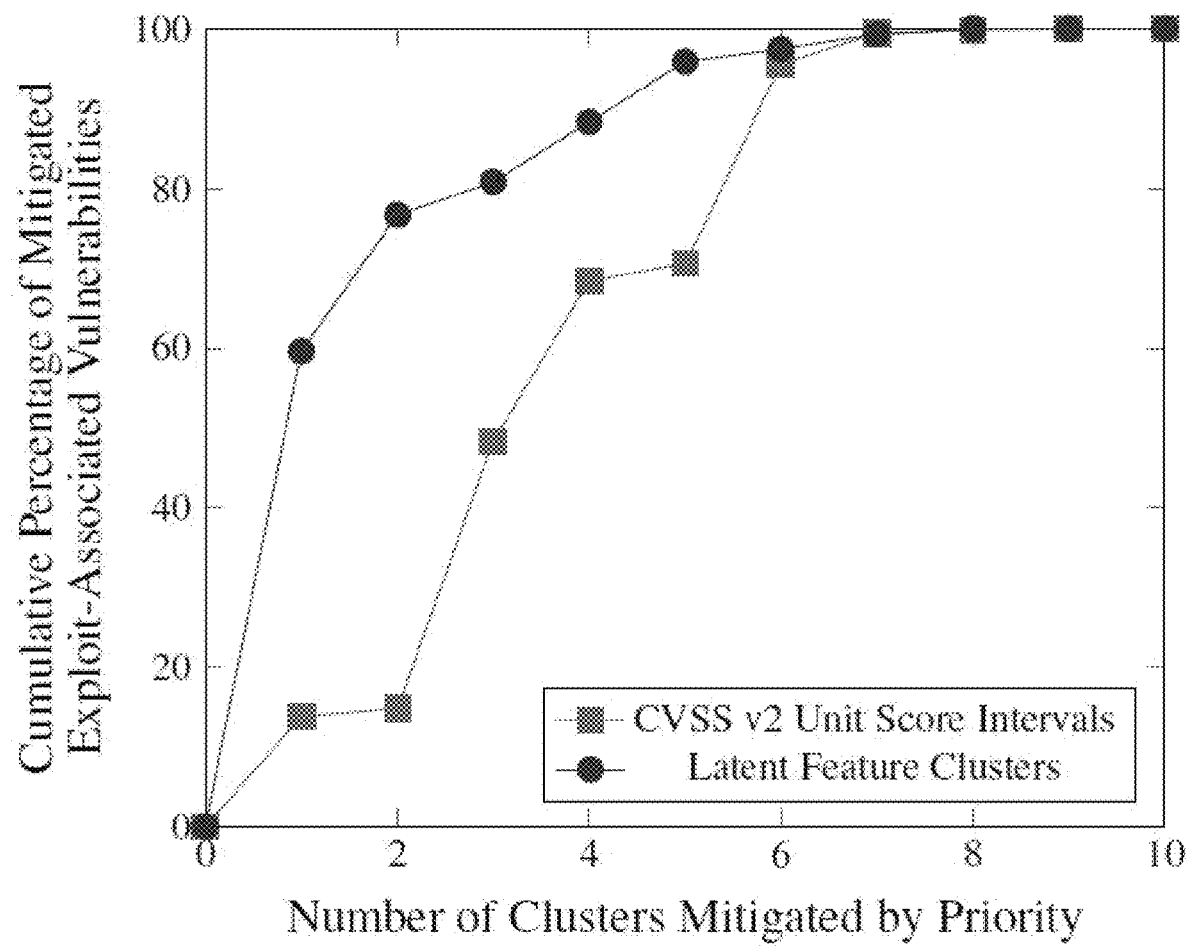
FIG. 14 shows the cumulative reduction of exploit-associated vulnerabilities in the 2013 calendar year.

In a non-limiting example to illustrate a rank-ordering of vulnerabilities, a 10-cluster classification is chosen, which reasonably balances the intracluster variance of exploit counts and the exploits per member per cluster. It should be understood that fewer or more k cluster classification may be more optimal than 10-cluster classification used in this example. FIG. 14 shows the cumulative reduction of exploit-associated vulnerabilities in the 2013 calendar year assuming that they are mitigated in priority order using (1) the 10-cluster ordering and (2) CVSS scores "clustered" by unit-score intervals. It is noteworthy that the 10-cluster ordering based on the algorithms and risky rating system described herein substantially outperforms CVSS scoring for this example from the Exploit-DB (third party exploit database). This is in part because vulnerabilities with CVSS scores $v \in [7,8)$ were the most exploited in 2013, not those with scores of $v \in [9,10]$. Also observed in this example is that both approaches achieve similar performance in the reduction of exploit-associated vulnerabilities once 6 clusters are mitigated, indicating that low-scoring vulnerabilities and low-ranked clusters have few exploits.

Figure 15:
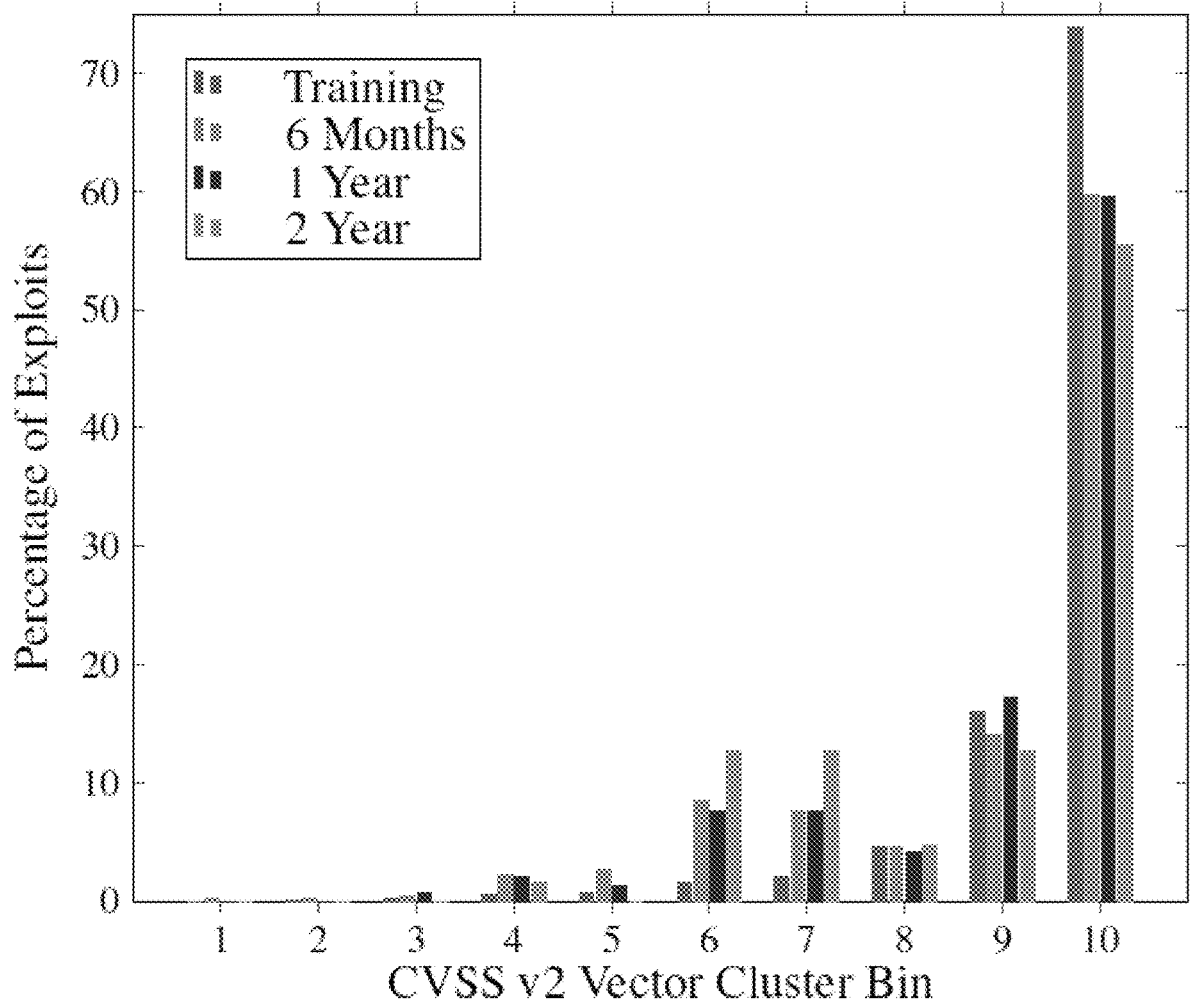
FIG. 15 depicts exploit emergence into 10-cluster bins over 4 different time periods for CVSS version 2 scores.

The above indicates that a straightforward application of the latent feature approach described herein can do a much better job at ranking the most severe vulnerabilities than conventional reliance on the CVSS score. When the risk rating system is used for different time slices, it is observed that new exploits are distributed approximately equally to that of the original clusters as depicted in FIG. 15. This demonstrates that the exploit emergence into the clusters is relatively stable over time.

Figure 16:
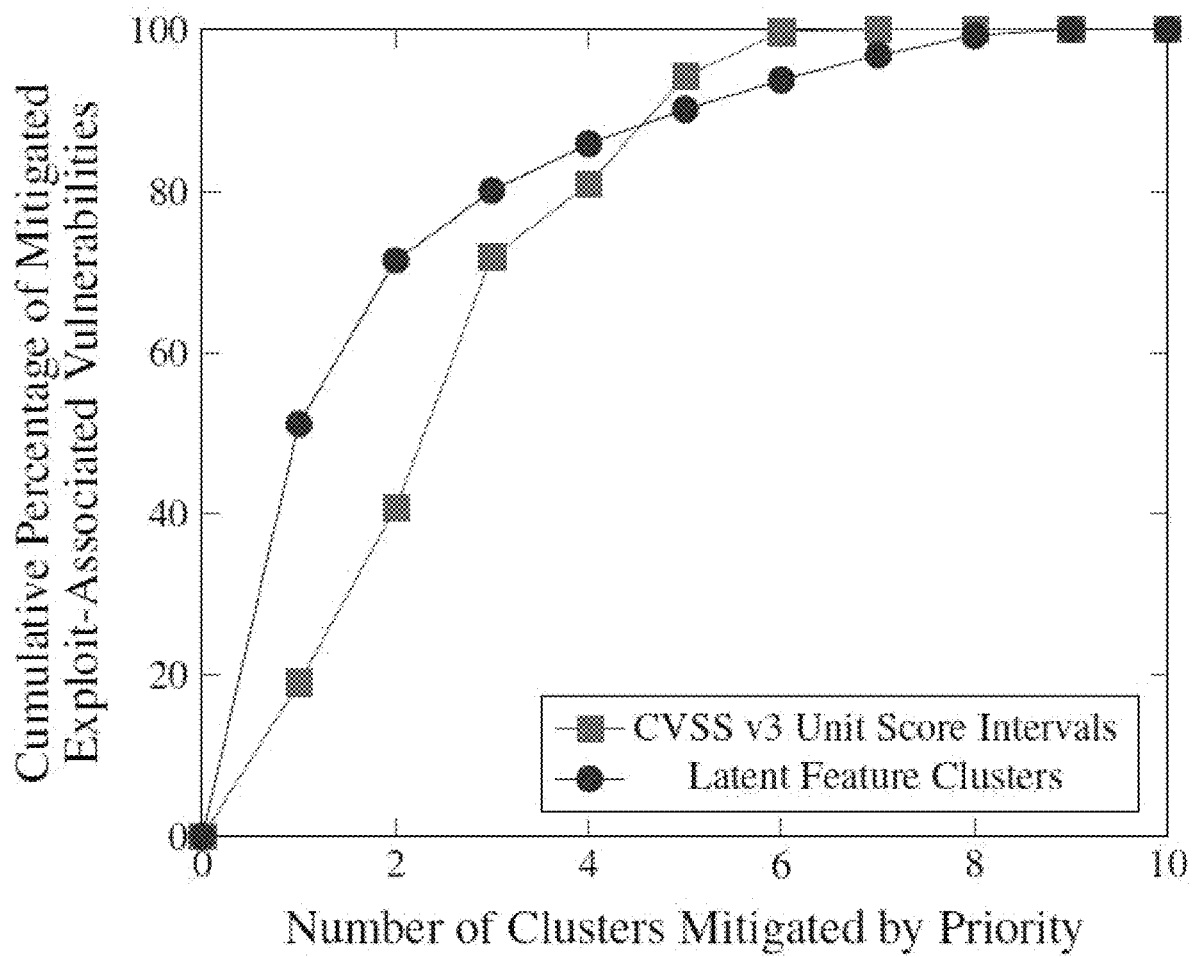
FIG. 16 shows mitigating vulnerabilities in priority order via decreasing risk in the latent feature clusters captures more exploit-associated vulnerabilities earlier than by using descending CVSS version 3 scores.

The above analysis may also be performed using vector clusters based on CVSS version 3 scores as depicted in FIG. 16. Again, 10 clusters are chosen to compare directly to CVSS version 3 unit score intervals, although a more optimal choice of clusters is 22, as is evident from FIG. 8. FIG. 16 shows the same cumulative reduction of exploit-associated vulnerabilities and CVSS version 3 scores "clustered" by unit-score intervals through the end of 2017 with exploits from Exploit-DB (third party exploit database).

Figure 17:
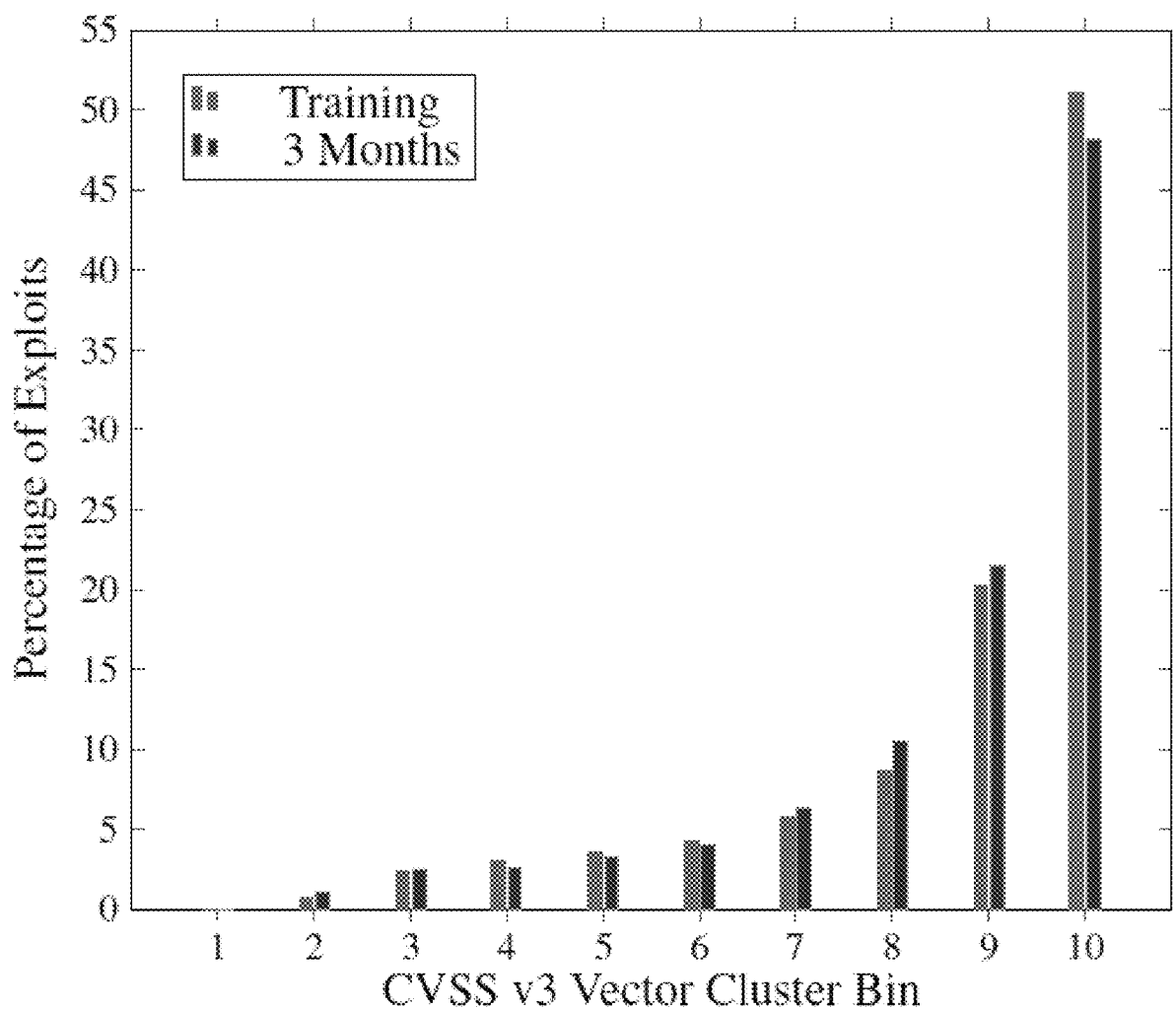
FIG. 17 depicts exploit emergence into 10-cluster bins over 3 different time periods for CVSS version 3 scores.
Figure 18:
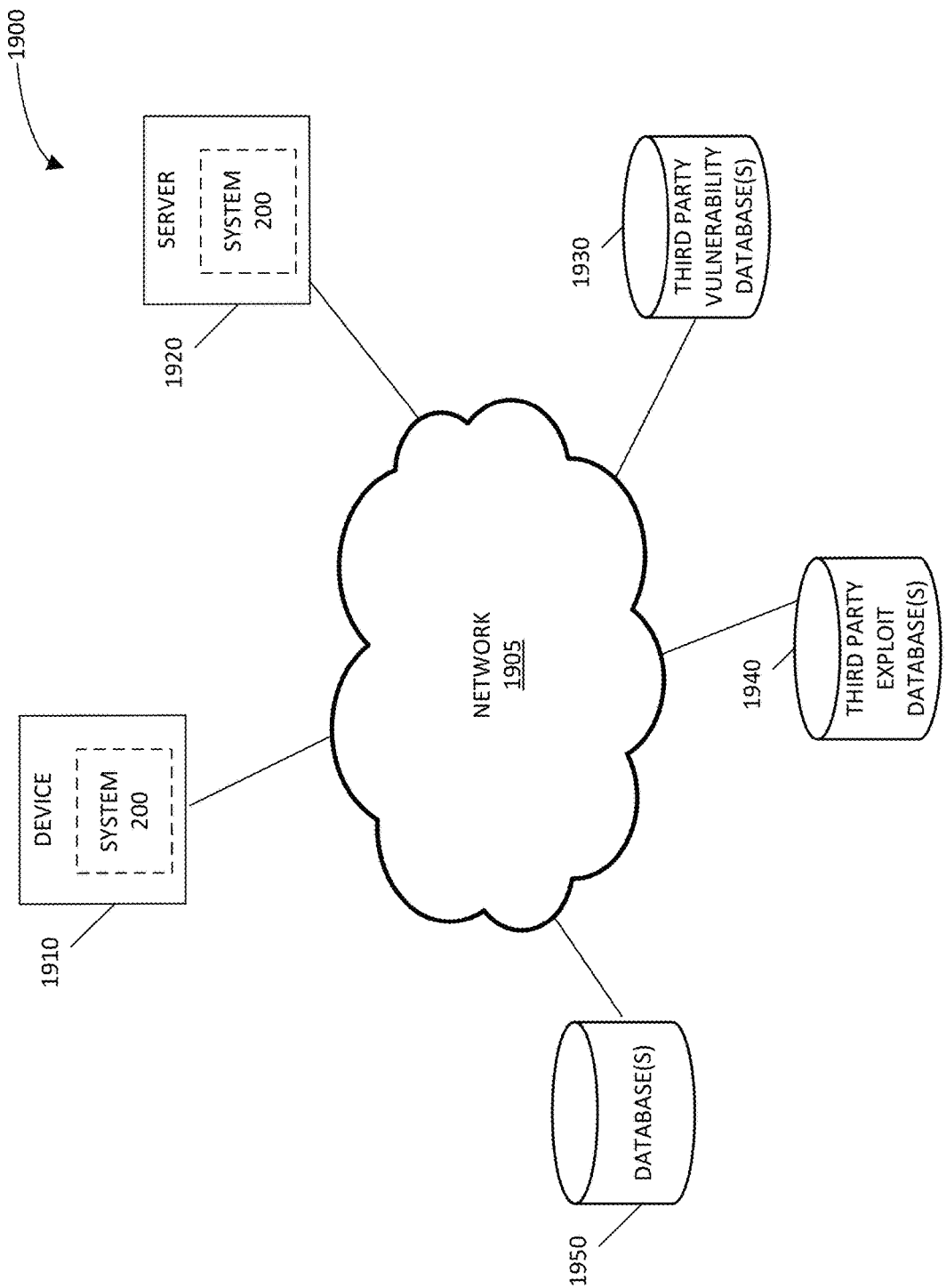
FIG. 18 illustrates a network diagram depicting a system for implementing the risk rating system, according to an example embodiment.

A comparison between the exploits that emerge from 2015 through mid-2017 to those that emerge three months later is performed. Similar to the results on the CVSS version 2 clusters (FIG. 15), the results in FIG. 17 show that the exploit emergence into the clusters defined by the risk rating system is stable. Even if exploits are developed for a very different distribution of vulnerabilities, the algorithm implemented in the risk rating system described herein automatically adjusts, while the CVSS version 3 scoring and resultant prioritization remains static.

In this manner, the similarity calculation and clustering implemented in the risk rating system described herein are data-driven analyses to present improvements to conventional software vulnerability ranking systems. Moreover, by tying the existence of exploits to the risk presented by a vulnerability, the risk rating system provides an improvement to conventional methods of vulnerability ratings. By using exploit data provided by third party sources, the conditional probability has been found to be given by a functional fit to a power law with an exponent of $7.5 \pm 1.4$, rising to a maximum probability of just over 9%. This probability represents a lower bound to the exploit probability, as the data cannot have accounted for all possible exploits. It should be appreciated that this interpretation of probability is in the context of undirected attacks, as a sufficiently motivated and capable adversary would be more likely to develop their own exploits and therefore change the probabilities.

Security Metric

Hosts/services typically contain multiple vulnerabilities providing varying degrees of risk that may be identified in the manner discussed previously. Embodiments provide a number of techniques to leverage this information to provide an overall security metric for each host/service in an enterprise network including an aggregation approach and an attacker valuation/return on investment approach.

Aggregation of Risk

To generate a security metric that provides an estimate of host/service risk in one embodiment the risk ratings of the software vulnerabilities identified for the host may be aggregated using the following equation:

$$P_{CompromisedHost} = 1 - \Pi_{v \in VulnerableServices}(1 - P_{CompromisedHost}(v))$$

In this equation, v represents a vulnerable software service or operating system residing on a host, $P_{CompromisedHost}(v)$ refers to a threat-agnostic or threat-specific inferred "probability" of attacker compromise of v, VulnerableServices represents the set of all vulnerable services resident on a host, and $P_{CompromisedHost}$ is the aggregated compromise risk presented by those services.

Attacker Valuation Approach

As the above equation applies to a random set of attackers choosing independent uncorrelated attack vectors, it is not a realistic metric of risk in some scenarios. Accordingly, to better estimate the specific security risk of a host/service, in one embodiment, the risk rating system also takes into consideration the cost to exploit a host/service vulnerability and the value of the host/service to an attacker as a means for determining how attractive the host/service is to an attacker. Put another way the approach attempts to determine the attacker's return on investment for exploiting a vulnerability. These factors are further discussed below.

Return on investment (ROI) can be an appropriate metric to guide business decisions. The attacker valuation approach takes into consideration the ROI to an attacker of exploiting a vulnerability in determining a security metric for the host or service. More particularly, in one embodiment, the attacker valuation module of the risk rating system estimates the host/service value to an attacker. Not all hosts/services are created equal. For example, attacking an unused laser printer is likely of less interest to an attacker than attacking a file share server or a database loaded with personal information of employees or company financial data. In one embodiment, different hosts/services on the network are assigned values based on pre-defined criteria. For example, the host value may be assigned based on one or more of a value of assets connected to the host, a value of data stored at the host, and a type of the host. It will be appreciated that other criteria for assigning value to a host/service may also be employed within the scope of the present invention.

In one embodiment, the cost to acquire root access to a host utilizing an applicable exploit is identified. From an attacker's point of view, it is assumed that he or she would want to hack the enterprise network using the least effort. The cost of exploits to attack particular hosts on the network is used as a proxy for effort. There is a thriving market for exploits on the dark web, some of which are free and some of which are sold. Additionally, commercial entities like Zerodium® pay security researchers to acquire their zero-day discoveries. In one embodiment, an exploit's cost can be estimated from cost information about the exploit identified from a third party source.

In another embodiment, the cost of the exploit may be related to the ease of use of, or access to, the exploit by a potential attacker. For example a predefined value may be provided by the risk rating system for exploits that are usable by novices or are widely available. In one embodiment, the cost of the exploit may be a pre-defined value related to the length of time the exploit takes to execute or the amount of computing resources required to execute the exploit.

The security metric representing the risk to the host/service may then be calculated based on the host/service value and the exploit cost. In one embodiment, the value of the host/service is divided by the cost of the exploit, and the quotient is used to generate the security metric as either the basis for the metric or the metric value itself. Hosts/services which have the highest ROIs represent the best targets from an attacker's point of view and the security metric for each host/service represents this risk.

Exemplary Advantages

As discussed herein, embodiments provide multiple advantages over conventional systems and methods for performing software vulnerability detection and/or assessment. For example, the risk rating system described herein reduces the volume of information to a tractable amount. Conventional vulnerability scanners produce an enormous amount information. Thousands of pages of reports are often produced every month for an enterprise-scale network using the conventional vulnerability scanners. These reports are a consequence of the fact that networks of most enterprises contain more than one vulnerability. As a result network defenders are overwhelmed with data which is not actionable.

The risk rating system described herein also permits efficient prioritization of defenders' time. Due to the data deluge mentioned above, defenders typically resort to shortcuts such as patching only the most severe vulnerabilities, while ignoring clusters of software vulnerabilities on a given host or service which may combine to create a dangerous situation. The relevant question for defenders is what is the best use of his or her time to optimally increase the security of the network, given that every vulnerability cannot be fixed in the given time period. The risk rating system's risk rating and security metric approach enables the defender to fix the more exploitable vulnerabilities.

Moreover, the risk rating described herein is data-driven rather than based primarily on human assigned ratings. A major shortcoming of conventional vulnerability solutions is that they are based on the subjective judgement of subject-matter-experts, rather than on empirical data. The various features of the risk rating system described herein, including grouping/clustering in latent feature space, using known exploits data as a proxy for risk, and economic-based risk aggregation, replace subjective judgement with empirical data.

Furthermore, the risk rating system described herein is forward-looking. Because the risk rating system clusters vulnerabilities in latent space created by data of known vulnerabilities and assigns vulnerabilities near to one another (in the same cluster) the same risk rating, vulnerabilities which are similar to ones with exploits, but for which exploits have not yet appeared, are still marked as risky.

Exemplary Systems for Implementation

Figure 19:
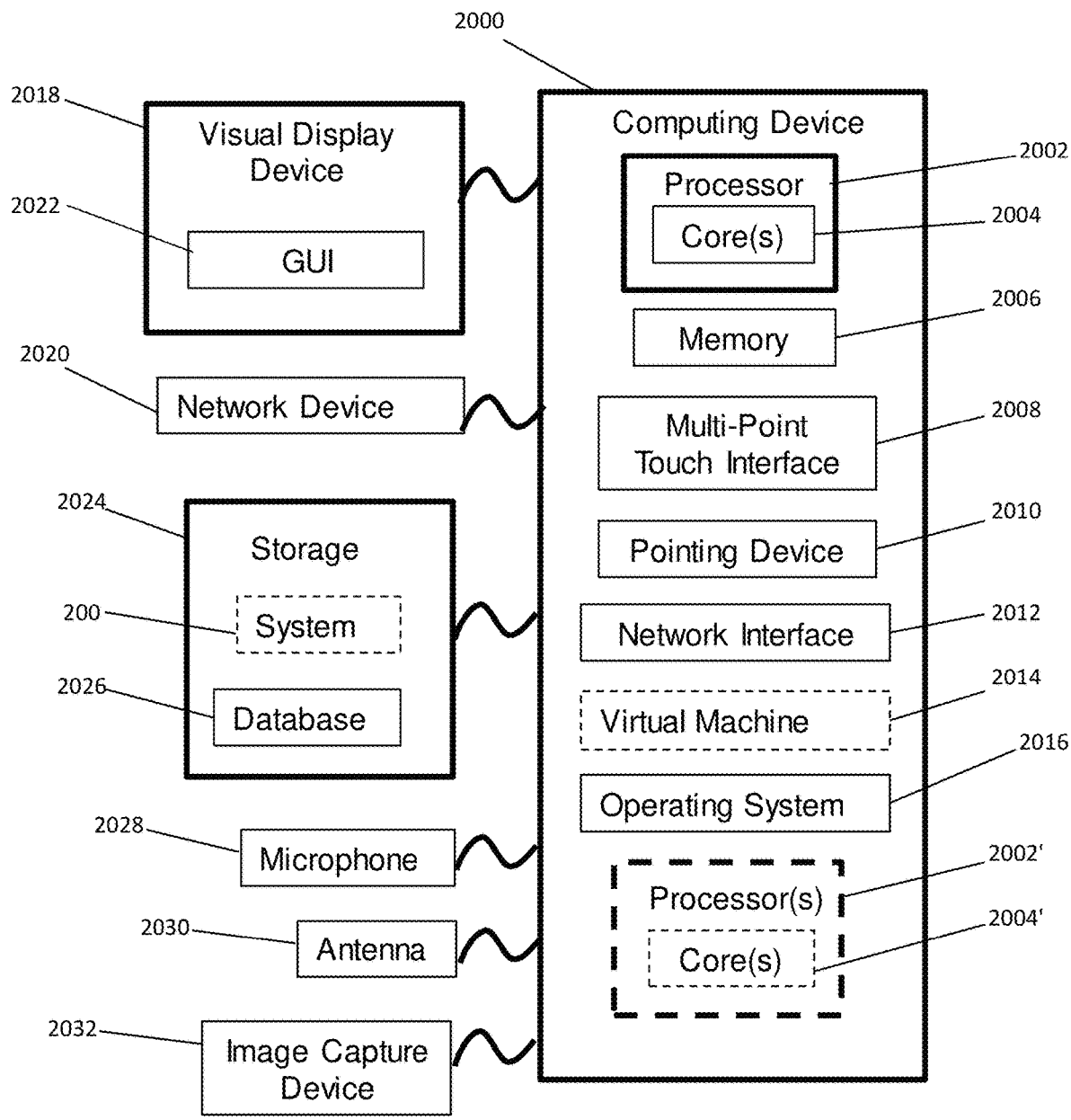
FIG. 19 is a block diagram of an exemplary computing device that can be used to implement exemplary embodiments of the risk rating system described herein.

FIG. 19 illustrates a network diagram depicting a system 1900 for implementing the risk rating system, according to an example embodiment. The system 1900 can include a network 1905, device 1910, server 1920, third party vulnerability database(s) 1930, third party exploit database(s) 1940, and database(s) 1950. Each of components 1910, 1920, 1930, 1940, and 1950 is in communication with the network 1905.

In an example embodiment, one or more portions of network 1905 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 1910 may comprise, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, mini-computers, and the like. The user device 710 can include one or more components described in relation to computing device 2000 shown in FIG. 20.

In an example embodiment, some of the components of the risk rating system 200 are implemented in the device 1910, and other components of the risk rating system 200 is implemented in the server 1920. As such, the device 1910 may be configured to perform some of the functionalities of the risk rating system 200 described herein, while the server 1920 is configured to perform other functionalities of the risk rating system 200 described herein.

The third party vulnerability database(s) 1930 store data related to known software vulnerabilities. As described herein, database(s) 1930 may be NVD or other data sources storing data related to known software vulnerabilities.

The third party exploit database(s) 1940 store data related to exploits. As described herein, database(s) 1940 may be sources available on the dark web, information available from commercial security products such as Symantec®, information available at open source exploit databases, intelligence, or other data sources storing data related to known exploits.

Each of the server 1920, third party vulnerability database(s) 1930, third party exploit database(s) 1940 and the database(s) 1950 is connected to the network 1905 via a wired or wireless connection. The server 1920 comprises one or more computers or processors configured to communicate with the device 1910, third party vulnerability database(s) 1930, third party exploit database(s) 1940, and database(s) 1950 via network 1905. The server 1920 hosts one or more applications or websites accessed by the device 1910 and/or facilitates access to the content of database(s) 1950. Database(s) 1950 comprise one or more storage devices for storing data and/or instructions (or code) for use by the device 1910 and the server 1920. The database(s) 1950, and/or the server 1920, may be located at one or more geographically distributed locations from each other or from the device 1910. Alternatively, the database(s) 1950 may be included within the server 1920.

FIG. 20 is a block diagram of an exemplary computing device 2000 that may be used to implement exemplary embodiments of the risk rating system 200 described herein. The computing device 2000 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 2006 included in the computing device 2000 may store computer-readable and computer-executable instructions or software for implementing exemplary embodiments of the risk rating system. The computing device 2000 also includes configurable and/or programmable processor 2002 and associated core 2004, and optionally, one or more additional configurable and/or programmable processor(s) 2002' and associated core(s) 2004' (for example, in the case of computer systems having multiple processors/cores), for executing computer-readable and computer-executable instructions or software stored in the memory 2006 and other programs for controlling system hardware. Processor 2002 and processor(s) 2002' may each be a single core processor or multiple core (2004 and 2004') processor.

Virtualization may be employed in the computing device 2000 so that infrastructure and resources in the computing device may be shared dynamically. A virtual machine 2014 may be provided to handle a process running on multiple processors so that the process appears to be using only one computing resource rather than multiple computing resources. Multiple virtual machines may also be used with one processor.

Memory 2006 may include a computer system memory or random access memory, such as DRAM, SRAM, EDO RAM, and the like. Memory 2006 may include other types of memory as well, or combinations thereof.

A user may interact with the computing device 2000 through touch-enabled display surface which may display one or more graphical user interfaces 2022 that may be provided in accordance with exemplary embodiments. The computing device 2000 may include other I/O devices for receiving input from a user, for example, a keyboard, touch-screen, or any suitable multi-point touch interface 2008, a pointing device 2010 (e.g., a mouse), a microphone 2028, and/or an image capturing device 2032 (e.g., a camera or scanner). The multi-point touch interface 2008 (e.g., keyboard, pin pad, scanner, touch-screen, etc.) and the pointing device 2010 (e.g., mouse, stylus pen, etc.) may be coupled to the visual display device 2018. The computing device 2000 may include other suitable conventional I/O peripherals. The multi-point touch interface 2008, pointing device 2010, and the image capturing device 2032 may be the secure I/O interface via which the user can provide a response to the assurance request and/or requests from third party verifiers for information.

The computing device 2000 may also include one or more storage devices 2024, such as a hard-drive, CD-ROM, or other computer readable media, for storing data and computer-readable instructions and/or software that implement exemplary embodiments of the risk rating system described herein. Exemplary storage device 2024 may also store one or more databases for storing any suitable information required to implement exemplary embodiments. For example, exemplary storage device 2024 can store one or more databases 2026 for storing information to be used by embodiments of the system 200. The databases may be updated manually or automatically at any suitable time to add, delete, and/or update one or more items in the databases.

The computing device 2000 can include a network interface 2012 configured to interface via one or more network devices 2020 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing device 2000 can include one or more antennas 2030 to facilitate wireless communication (e.g., via the network interface) between the computing device 2000 and a network. The network interface 2012 may include a built-in network adapter, network interface card, PCMCIA network card, card bus network adapter, wireless network adapter, USB network adapter, modem or any other device suitable for interfacing the computing device 2000 to any type of network capable of communication and performing the operations described herein. Moreover, the computing device 2000 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 2000 may run any operating system 2016, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 2016 may be run in native mode or emulated mode. In an exemplary embodiment, the operating system 2016 may be run on one or more cloud machine instances.

The description contained herein is presented to enable a person skilled in the art to create and use a risk rating system. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A system for determining a risk rating for software vulnerabilities, the system comprising:
   one or more computing devices that include a processor and a memory;
   one or more databases holding data related to at least one of known software vulnerabilities and known exploits known to have actually occurred, data relating to the known exploits retrieved from one or more third party sources;
   wherein the one or more computing devices are configured to execute at least one of a vulnerability module, exploit module, and host-specific and service-specific vulnerability module:
   wherein the vulnerability module when executed:
      generates a vector space holding a plurality of vectors for the plurality of known software vulnerabilities based on the data related to known software vulnerabilities, each vector associated with a set of characteristics of a corresponding known software vulnerability, and
      groups the plurality of known software vulnerabilities into one or more sets of similar software vulnerabilities based on the characteristics;
   wherein the exploit module when executed:
      determines the applicability of one or more known exploits to individual software vulnerabilities represented in the one or more sets of similar software vulnerabilities using the data related to known exploits;
      determines a risk rating for each of the one or more sets of similar software vulnerabilities based on the determined applicability of the known exploits to individual software vulnerabilities represented in each of the one or more sets of similar software vulnerabilities; and
      stores and associates the risk rating with a corresponding set of similar software vulnerabilities in the one or more databases; and
   wherein the host-specific and service-specific vulnerability module when executed:
      analyzes a plurality of hosts, or services or both that are associated with a network to identify host-specific software vulnerabilities, or service-specific software vulnerabilities, or both;

compares the host-specific software vulnerabilities, or service-specific software vulnerabilities, or both, with the individual software vulnerabilities represented in the one or more sets of similar software vulnerabilities; and determines a risk rating for each of the host-specific software vulnerabilities, or service-specific software vulnerabilities, or both, based on the comparison of the host-specific software vulnerabilities, or service-specific software vulnerabilities, or both, with the one or more sets of similar software vulnerabilities and their respective risk ratings.

2. The system of claim 1 wherein the vulnerability module groups the plurality of known software vulnerabilities into one or more sets of similar software vulnerabilities using at least one of spectral clustering, a neural network, logistic regression analysis, partial least squares, a recommender system, random decision forests, least squares linear decision analysis, and other forms of supervised or unsupervised machine learning that classify together items in a relevant feature space based on a defined criteria.

3. The system of claim 1, wherein the host-specific and service-specific vulnerability module is further configured to:
filter the data related to the known exploits based on at least one of a specific attacker's techniques, tools, and procedures; and
adjust the risk rating for each of the host-specific software vulnerabilities, or service-specific software vulnerabilities, or both, based on the filtered data.

4. The system of claim 1, wherein at least one of the one or more computing devices is further configured to execute a security metric module that when executed: determines a security metric for each of the hosts, or services, or both, associated with the network.

5. The system of claim 4, wherein at least one of the one or more computing devices is further configured to execute an aggregation module that when executed:
aggregates, for each of the at least one of hosts, or services, or both, associated with the network, the risk ratings for host-specific software vulnerabilities, or service-specific software vulnerabilities, or both, to determine the security metric for the host or service.

6. The system of claim 4, wherein at least one of the one or more computing devices is further configured to execute a cost module that when executed:
determines a cost to an attacker of exploiting one or more of the host-specific software vulnerabilities, or service-specific software vulnerabilities, or both.

7. The system of claim 6, wherein the cost to the attacker is determined based on cost information of the one or more known exploits.

8. The system of claim 6, wherein the cost to the attacker is based on an amount of time needed to be expended by the attacker to exploit the one or more of the host-specific software vulnerabilities, or service-specific software vulnerabilities, or both.

9. The system of claim 6, wherein the cost to the attacker is based on enumerating a cost of obtaining root access through all possible paths made available via the host-specific software vulnerabilities, or service-specific software vulnerabilities, or both, and choosing the least expensive.

10. The system of claim 6, wherein at least one of the one or more computing devices is further configured to execute an attacker valuation module that when executed:
identifies a value of the host, service or both, the value based on at least one of a value of assets connected to the host, the service or both, a value of data stored at the host, the service or both, and a type of the host, the service or both; and
determines the security metric by dividing the value of the host or the service by a cost to an attacker of exploiting one or more of the host-specific software vulnerabilities, or service-specific software vulnerabilities, or both.

11. The system of claim 1, wherein the risk rating for the one or more sets of similar software vulnerabilities is calculated based on a fraction of the software vulnerabilities in each of the one or more sets of similar software vulnerabilities that have at least one associated exploit.

12. A computer-implemented method using at least one or more hardware processors for determining a risk rating for software vulnerabilities, the method comprising:
generating, by the one or more hardware processors, a vector space holding a plurality of vectors for a plurality of known software vulnerabilities based on data related to known software vulnerabilities, each vector associated with a set of characteristics of a corresponding known software vulnerability, and
grouping the plurality of known software vulnerabilities into one or more sets of similar software vulnerabilities based on the characteristics;
determining an applicability of one or more known exploits to individual software vulnerabilities represented in the one or more sets of similar software vulnerabilities using data related to known exploits known to have actually occurred, the data relating to the known exploits retrieved from one or more third party sources;
determining a risk rating for each of the one or more sets of similar software vulnerabilities based on the determined applicability of the known exploits to individual software vulnerabilities represented in each of the one or more sets of similar software vulnerabilities;
storing and associating the risk rating with a corresponding set of similar software vulnerabilities in a database;
analyzing a plurality of hosts, services or both that are associated with a network to identify host-specific software vulnerabilities, or service-specific software vulnerabilities, or both;
comparing the host-specific software vulnerabilities, or service-specific software vulnerabilities, or both, with the individual software vulnerabilities represented in the one or more sets of similar software vulnerabilities; and
determining a risk rating for each of the host-specific software vulnerabilities, or service-specific software vulnerabilities, or both, based on the comparison of the host-specific software vulnerabilities, or service-specific software vulnerabilities, or both, with the one or more sets of similar software vulnerabilities and their respective risk ratings.

13. The method of claim 12 wherein the vulnerability module groups the plurality of known software vulnerabilities into one or more sets of similar software vulnerabilities using at least one of spectral clustering, a neural network, logistic regression analysis, partial least squares, a recommender system, random decision forests, least squares linear decision analysis, and other forms of supervised or unsupervised machine learning that classify together items in a relevant feature space based on a defined criteria.

14. The method of claim 12, further comprising:
filtering the data related to the known exploits based on at least one of a specific attacker's techniques, tools, and procedures; and
adjusting the risk rating for each of the host-specific software vulnerabilities, or service-specific software vulnerabilities, or both, based on the filtered data.

15. The method of claim 12, further comprising:
determining a security metric for each of the hosts, or services, or both, associated with the network.

16. The method of claim 15, further comprising:
aggregating, for each of the hosts, or services, or both, associated with the network, the risk ratings for host-specific software vulnerabilities, or service-specific software vulnerabilities, or both, to determine the security metric for the host or service.

17. The method of claim 16, further comprising:
determining a cost to an attacker of exploiting one or more of the host-specific software vulnerabilities, or service-specific software vulnerabilities, or both.

18. The method of claim 17, wherein the cost to the attacker is determined based on cost information of the one or more known exploits.

19. The method of claim 17, wherein the cost to the attacker is based on an amount of time needed to be expended by the attacker to exploit the one or more of the host-specific software vulnerabilities, or service-specific software vulnerabilities, or both.

20. The method of claim 17, wherein the cost to the attacker is based on enumerating a cost of obtaining root access through all possible paths made available via the host-specific software vulnerabilities, or service-specific software vulnerabilities, or both, and choosing the least expensive.

21. The method of claim 17, further comprising:
identifying a value of the host, service or both, the value based on at least one of a value of assets connected to the host, service or both, a value of data stored at the host, service or both and a type of the host, service or both; and
determining the security metric by dividing the value of the host or the service by a cost to an attacker of exploiting one or more of the host-specific software vulnerabilities, or service-specific software vulnerabilities, or both.

22. The method of claim 12, wherein the risk rating for the one or more sets of similar software vulnerabilities is calculated based on a fraction of the software vulnerabilities in each of the one or more sets of similar software vulnerabilities that have at least one associated exploit.

23. A non-transitory computer readable medium storing instructions for determining a risk rating for software vulnerabilities, the instructions when executed by a processor:
generate a vector space holding a plurality of vectors for a plurality of known software vulnerabilities based on data related to known software vulnerabilities, each vector associated with a set of characteristics of a corresponding known software vulnerability, and
group the plurality of known software vulnerabilities into one or more sets of similar software vulnerabilities based on the characteristics;
determine an applicability of one or more known exploits to individual software vulnerabilities represented in the one or more sets of similar software vulnerabilities using data related to known exploits known to have actually occurred, the data relating to the known exploits retrieved from one or more third party sources;
determine a risk rating for each of the one or more sets of similar software vulnerabilities based on the determined applicability of the known exploits to individual software vulnerabilities represented in each of the one or more sets of similar software vulnerabilities;
store and associate the risk rating with a corresponding set of similar software vulnerabilities in a database;
analyze a plurality of hosts, services or both that are associated with a network to identify host-specific software vulnerabilities, or service-specific software vulnerabilities, or both;
compare the host-specific software vulnerabilities, or service-specific software vulnerabilities, or both, with the individual software vulnerabilities represented in the one or more sets of similar software vulnerabilities; and
determine a risk rating for each of the host-specific software vulnerabilities, or service-specific software vulnerabilities, or both, based on the comparison of the host-specific software vulnerabilities, or service-specific software vulnerabilities, or both, with the one or more sets of similar software vulnerabilities and their respective risk ratings.

24. The non-transitory computer readable medium of claim 23 wherein the vulnerability module groups the plurality of known software vulnerabilities into one or more sets of similar software vulnerabilities using at least one of spectral clustering, a neural network, logistic regression analysis, partial least squares, a recommender system, random decision forests, least squares linear decision analysis, and other forms of supervised or unsupervised machine learning that classify together items in a relevant feature space based on a defined criteria.

25. The non-transitory computer readable medium of claim 24, wherein the instructions when executed by the processor further:
aggregate, for each of the hosts, or services, or both, associated with the network, the risk ratings for host-specific software vulnerabilities, or service-specific software vulnerabilities, or both, to determine the security metric for the host or service.

26. The non-transitory computer readable medium of claim 23, wherein the instructions when executed by the processor further:
filter the data related to the known exploits based on at least one of a specific attacker's techniques, tools, and procedures; and
adjust the risk rating for each of the host-specific software vulnerabilities, or service-specific software vulnerabilities, or both, based on the filtered data.

27. The non-transitory computer readable medium of claim 23, wherein the instructions when executed by the processor further:
determines a security metric for each of the hosts, or services, or both, associated with the network.

28. The non-transitory computer readable medium of claim 27, wherein the instructions when executed by the processor further:
determine a cost to an attacker of exploiting one or more of the host-specific software vulnerabilities, or service-specific software vulnerabilities, or both.

29. The non-transitory computer readable medium of claim 28, wherein the cost to the attacker is determined based on cost information of the one or more known exploits.

30. The non-transitory computer readable medium of claim 28, wherein the cost to the attacker is based on an amount of time needed to be expended by the attacker to exploit the one or more of the host-specific software vulnerabilities, or service-specific software vulnerabilities, or both.

31. The non-transitory computer readable method of claim 28, wherein the cost to the attacker is based on enumerating a cost of obtaining root access through all possible paths made available via the host-specific, or service-specific software vulnerabilities, or both, and choosing the least expensive.

32. The non-transitory computer readable method of claim 28, wherein the instructions when executed by the processor further:
- identify a value of the host, service or both, the value based on at least one of a value of assets connected to the host, service or both, a value of data stored at the host, service or both, and a type of the host service or both, and
- determine the security metric by dividing the value of the host or the service by a cost to an attacker of exploiting one or more of the host-specific software vulnerabilities, or service-specific software vulnerabilities, or both.

33. The non-transitory computer readable medium of claim 23, wherein the risk rating for the cluster of software vulnerabilities is calculated based on a fraction of vulnerabilities in the cluster that have at least one associated exploit.

\* \* \* \* \*